United States Patent
Kumar et al.

(10) Patent No.: US 12,439,286 B2
(45) Date of Patent: Oct. 7, 2025

(54) APPLICATION, SERVICES, AND NETWORK SLICE BASED MEASUREMENTS FOR MINIMIZATION OF DRIVE TEST REPORTING

(71) Applicant: QUALCOMM Incorporated, San Diego, CA (US)

(72) Inventors: Rajeev Kumar, San Diego, CA (US); Ozcan Ozturk, San Diego, CA (US); Xipeng Zhu, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 17/411,434

(22) Filed: Aug. 25, 2021

(65) Prior Publication Data

US 2022/0070709 A1 Mar. 3, 2022

Related U.S. Application Data

(60) Provisional application No. 63/070,726, filed on Aug. 26, 2020.

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS 9,473,967 B2 10/2016 Zhang et al.
9,674,755 B2 6/2017 Ray et al.
(Continued)

FOREIGN PATENT DOCUMENTS

CN 106105317 A 11/2016
CN 110870339 A 3/2020
(Continued)

OTHER PUBLICATIONS

Ericsson: "Analysis of QoE Measurements at OAM and RAN", 3GPP Draft, 3GPP TSG-RAN WG3 Meeting #113-e, R2-2101273, 3rd Generation Partnership Project (3GPP), Mobile Competence Centre, 650, Route Des Lucioles, F-06921 Sophia-Antipolis Cedex, France, vol. RAN WG3, No. Online, Jan. 25, 2020-Feb. 4, 2020, Jan. 14, 2021 (Jan. 14, 2021), XP051972871, 4 Pages, Retrieved from the Internet: URL: https://ftp.3gpp.org/tsg_ran/WG2_RL2/TSGR2_113-e/Docs/R2-2101273.zip. R2-2101273—Light QE and Time Alignment Between QoE and MDT.docx [Retrieved -on Jan. 14, 2021] The Whole Document.

(Continued)

*Primary Examiner* — Sujoy K Kundu
*Assistant Examiner* — Raul Rivas
(74) *Attorney, Agent, or Firm* — Holland & Hart LLP/Qualcomm

(57) ABSTRACT

In some wireless communications systems, devices may support minimization of drive test (MDT) reporting, quality of service (QoS) reporting, and quality of experience (QoE) measurements. A user equipment (UE) and the serving base station may obtain measurements in accordance with a measurement configuration that indicates various triggering events or reporting adjustment factors associated with the measurements. The measurement configuration may indicate a triggering event such as the start of an application or service at the UE, and the UE may obtain MDT or QoE (Continued)

measurements based on identifying the application or service. Additionally, the serving base station may obtain MDT and QoE measurements based on identifying the application and service or a notification from the UE. The UE and the serving base station may identify reporting adjustment factors based on network slicing, area configurations and times of the day affecting the reporting interval and reporting amount for the measurement report.

28 Claims, 22 Drawing Sheets

(56) References Cited

U.S. PATENT DOCUMENTS

| | | | |
|---|---|---|---|
| 10,341,895 B2 | 7/2019 | Zhu et al. | |
| 2012/0311126 A1 | 12/2012 | Jadallah et al. | |
| 2013/0114446 A1 | 5/2013 | Liu et al. | |
| 2018/0041913 A1* | 2/2018 | Zhu | H04L 65/65 |
| 2018/0324617 A1 | 11/2018 | Schmidt et al. | |
| 2022/0369114 A1* | 11/2022 | Toeda | H04W 28/0231 |
| 2022/0417780 A1* | 12/2022 | Liu | H04W 28/0268 |
| 2023/0362442 A1* | 11/2023 | Jain | H04N 21/4825 |

FOREIGN PATENT DOCUMENTS

| | | |
|---|---|---|
| WO | WO-2013074751 | 5/2013 |
| WO | WO-2015108714 | 7/2015 |
| WO | WO-2020150952 A1 | 7/2020 |
| WO | WO-2020164082 A1 | 8/2020 |
| WO | WO-2021215886 A1 | 10/2021 |

OTHER PUBLICATIONS

International Search Report and Written Opinion—PCT/US2021/047667—ISA/EPO—Dec. 7, 2021.
Huawei et al., "Discussion QoE Measurement Collection for Streaming Services", 3GPP TSG-RAN WG2 #96, R2-168022, Reno, Nevada, USA, Nov. 14-18, 2016, pp. 1-22.
Qualcomm Incorporated, "Integrating MTSI QE Metrics into MDT", 3GPP TSG-RAN WG2 Meeting #90, R2-152491, Fukuoka, Japan, May 25-29, 2015, May 15, 2015, 4 Pages, Section 2-3.

* cited by examiner

APPLICATION, SERVICES, AND NETWORK SLICE BASED MEASUREMENTS FOR MINIMIZATION OF DRIVE TEST REPORTING

CROSS REFERENCE

The present Application for Patent claims the benefit of U.S. Provisional Patent Application Ser. No. 63/070,726 by KUMAR et al., entitled "APPLICATION, SERVICES, AND NETWORK SLICE BASED MEASUREMENTS FOR MINIMIZATION OF DRIVE TEST REPORTING," filed Aug. 26, 2020, assigned to the assignee hereof, and expressly incorporated by reference herein in its entirety.

FIELD OF TECHNOLOGY

The following relates to wireless communications, including application, services, and network slice based measurements for minimization of drive test (MDT) reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may report measurements to a network via a measurement report. In one example, the reported measurements may relate to communications quality and may be included in a minimization of drive test (MDT) report. Improvements to MDT reporting may be beneficial.

SUMMARY

The described techniques relate to improved methods, systems, devices, and apparatuses that support application, services, and network or radio access network (RAN) slice based measurements for minimization of drive test (MDT) and quality of experience (QoE) reporting. Devices, such as a user equipment (UE) and a serving base station, may collect various immediate MDT measurements that may be used by the network for quality of service (QoS) verification and other MDT purposes. Additionally or alternatively, the UE may obtain the QoE measurements to include in a QoE measurement report for application layer QoE verification. The serving base station may obtain the MDT and QoE report from the UE and may transmit the MDT and QoE reports to a trace collection entity (TCE) together with MDT measurements obtained by the serving base station. In some examples, the reports may be used to increase communications quality and device performance in the network.

The UE and the serving base station may obtain MDT measurements based on receiving a measurement configuration (e.g., for performing QoE measurements or MDT measurements) from an operations, administration, and maintenance (OAM) interface that indicates a number of triggering events for which the UE and the serving base station are to begin MDT measurements. For example, the measurement configuration may indicate that the start of an application or service at the UE is a triggering event for obtaining MDT or QoE measurements. In one implementation, the UE may identify a list of application or service identifiers (IDs) that qualify as measurement collection triggers, and the UE may compare an application or service ID to the list of application or service IDs to determine whether to begin MDT or QoE measurements and to generate the measurement report. Upon the start of the qualifying application and services for MDT measurements, the base station and the UE may begin the immediate MDT measurements, where the base station and the UE may obtain different sets of MDT measurements. For example, the UE may obtain radio resource management (RRM) measurements, uplink packet data convergence protocol (PDCP) packet queueing delay, etc. as immediate measurements, while the base station may obtain data volume, throughput, packet delay, and packet loss in a Radio Access Network (RAN) and over the air interface. Additionally, or alternatively, the UE may send an indication to the base station upon satisfying the trigger condition (or triggering event) to indicate the start or end of an application or a service session. This indication may be used as an indication to collect MDT measurements or may be used for other RAN optimizations or requirements. In some examples, the UE may obtain a generic QoE reporting configuration upon connection with the network, or the UE may receive an application and service specific QoE reporting configuration.

In another implementation, the UE and the serving based station may receive a measurement configuration that includes reporting adjustment factors which affect at least one of a reporting interval or a reporting amount for reporting the MDT report. For example, network or RAN slicing may provision dedicated resources for the applications and services, and the UE may identify different MDT or QoS reporting for different network or RAN slices. Similarly, the serving base station may identity different MDT reporting for different network or RAN slices. In addition, the UE and the serving base station may vary the reporting interval and reporting amount for the MDT measurements based on an area configuration and time of the day.

A method of wireless communications at a UE is described. The method may include receiving, from an OAM interface, a measurement configuration for performing MDT measurements to include in a MDT report and QoE measurements to include in a QoE report, identifying, from the measurement configuration, one or more triggering events which, upon occurrence, trigger the MDT measurements and the QoE measurements, detecting a start of an application or a service at the UE, where the start of the application or service is one of the one or more triggering events, transmitting, to a serving base station, an indication that the one or more triggering events has occurred, obtaining the MDT measurements and the QoE measurements based at least in part on the start of the application or the service being one of the one or more triggering events, and transmitting, to a server, the MDT report and the QoE report that includes the MDT measurements and the QoE measurements.

An apparatus for wireless communications at a UE is described. The apparatus may include a processor, memory coupled with the processor, and instructions stored in the memory. The instructions may be executable by the processor to cause the apparatus to receive, from an OAM interface, a measurement configuration for performing MDT measurements to include in a MDT report and QoE measurements to include in a QoE report, identify, from the measurement configuration, one or more triggering events which, upon occurrence, trigger the MDT measurements and the QoE measurements, detect a start of an application or a service at the UE, where the start of the application or service is one of the one or more triggering events, transmitting, to a serving base station, an indication that the one or more triggering events has occurred, obtain the MDT measurements and the QoE measurements based at least in part on the start of the application or the service being one of the one or more triggering events, and transmit, to a server, the MDT report and the QoE report that includes the MDT measurements and QoE measurements.

Another apparatus for wireless communications at a UE is described. The apparatus may include means for receiving, from an OAM interface, a measurement configuration for performing MDT measurements to include in a MDT report and QoE measurements to include in a QoE report, means for identifying, from the measurement configuration, one or more triggering events which, upon occurrence, trigger the MDT measurements and QoE measurements, means for detecting a start of an application or a service at the UE, where the start of the application or the service is one of the one or more triggering events, means for transmitting, to a serving base station, an indication that the one or more triggering events has occurred, means for obtaining the MDT measurements and the QoE measurements based at least in part on the start of the application or service being one of the one or more triggering events, and means for transmitting, to a server, the MDT report and the QoE report that includes the MDT measurements and the QoE measurements.

A non-transitory computer-readable medium storing code for wireless communications at a UE is described. The code may include instructions executable by a processor to receive, from an OAM interface, a measurement configuration for performing MDT measurements to include in a MDT report and QoE measurements to include in a QoE report, identify, from the measurement configuration, one or more triggering events which, upon occurrence, trigger the MDT measurements and the QoE measurements, detect a start of an application or a service at the UE, where the start of the application or the service is one of the one or more triggering events, transmit, to a serving base station, an indication that the one or more triggering events has occurred, obtain the MDT measurements and QoE measurements based at least in part on the start of the application or service being one of the one or more triggering events, and transmit, to a server, the MDT report and the QoE report that includes the MDT measurements and the QoE measurements.

Some examples of the method, apparatuses, and non-transitory computer-readable medium described herein may further include operations, features, means, or instructions for identifying one or more application or service IDs associated with the application or service, comparing the one or more application or service IDs to a list of IDs stored at the UE, where the list of IDs includes IDs for applications or services associated with the one or more triggering events, and determining that the one or more application or service IDs may be contained in the list of IDs stored at the UE based on the comparing.

Some examples of the method, apparatuses, and non-transitory computer-readable medium described herein may further include operations, features, means, or instructions for generating the MDT report and the QoE report to include the one or more application or service IDs based on determining that the one or more application or service IDs may be contained in the list of IDs stored at the UE.

In some examples of the method, apparatuses, and non-transitory computer-readable medium described herein, obtaining the MDT measurements may include operations, features, means, or instructions for obtaining radio resource management (RRM) measurements to include in the MDT report based on determining that the one or more application or service IDs may be contained in the list of IDs stored at the UE.

In some examples of the method, apparatuses, and non-transitory computer-readable medium described herein, the RRM measurements include at least one of a reference signal received power (RSRP) measurement or a reference signal received quality (RSRQ) measurement.

In some examples of the method, apparatuses, and non-transitory computer-readable medium described herein, the RRM measurements include periodic measurements, event-triggered measurements, or a combination thereof.

In some examples of the method, apparatuses, and non-transitory computer-readable medium described herein, obtaining the MDT measurements may include operations, features, means, or instructions for obtaining one or more localization measurements to include in the MDT report based on the start of the application or service triggering the obtaining of the one or more localization measurements.

In some examples of the method, apparatuses, and non-transitory computer-readable medium described herein, obtaining one or more localization measurements may include operations, features, means, or instructions for obtaining localization measurements as one or more received signal strength indicator (RSSI) measurements or round trip time (RTT) measurements, where the localization measurements may be associated with common location information, wireless local area network location information, Bluetooth location information, sensor information, or any combination thereof.

In some examples of the method, apparatuses, and non-transitory computer-readable medium described herein, obtaining the MDT measurements may include operations, features, means, or instructions for obtaining one or more QoS measurements to include in the MDT report based on the start of the application or service triggering the obtaining of the one or more QoS measurements.

In some examples of the method, apparatuses, and non-transitory computer-readable medium described herein, the one or more QoS measurements include one or more packet delay measurements or packet loss rate measurements.

Some examples of the method, apparatuses, and non-transitory computer-readable medium described herein may further include operations, features, means, or instructions for receiving, in the measurement configuration, an indication that the UE may be to include one or more application or service IDs in the MDT report, where the one or more application or service IDs prompt QoS measurements by a serving base station.

In some examples of the method, apparatuses, and non-transitory computer-readable medium described herein, the QoS measurements by the serving base station include a data volume measurement, an internet protocol throughout measurement, a packet delay measurement, a packet loss measurement, or any combination thereof.

A method for wireless communications at a UE is described. The method may include receiving, from an OAM interface, a first measurement configuration for performing one or more QoE measurements at the UE, the first measurement configuration being different from an application- or service-specific measurement configuration, detecting a start of an application or service at the UE, where the start of the application or service is a triggering event for initiating the one or more QoE measurements at the UE, performing the one or more QoE measurements at the UE in accordance with the first measurement configuration, and transmitting the one or more QoE measurements in a measurement report to a serving base station.

An apparatus for wireless communications at a UE is described. The apparatus may include a processor, memory coupled with the processor, and instructions stored in the memory. The instructions may be executable by the processor to cause the apparatus to receive, from an OAM interface, a first measurement configuration for performing one or more QoE measurements at the UE, the first measurement configuration being different from an application- or service-specific measurement configuration, detect a start of an application or service at the UE, where the start of the application or service is a triggering event for initiating the one or more QoE measurements at the UE, perform the one or more QoE measurements at the UE in accordance with the first measurement configuration, and transmit the one or more QoE measurements in a measurement report to a serving base station.

Another apparatus for wireless communications at a UE is described. The apparatus may include means for receiving, from an OAM interface, a first measurement configuration for performing one or more QoE measurements at the UE, the first measurement configuration being different from an application- or service-specific measurement configuration, means for detecting a start of an application or service at the UE, where the start of the application or service is a triggering event for initiating the one or more QoE measurements at the UE, means for performing the one or more QoE measurements at the UE in accordance with the first measurement configuration, and means for transmitting the one or more QoE measurements in a measurement report to a serving base station.

A non-transitory computer-readable medium storing code for wireless communications at a UE is described. The code may include instructions executable by a processor to receive, from an OAM interface, a first measurement configuration for performing one or more QoE measurements at the UE, the first measurement configuration being different from an application- or service-specific measurement configuration, detect a start of an application or service at the UE, where the start of the application or service is a triggering event for initiating the one or more QoE measurements at the UE, perform the one or more QoE measurements at the UE in accordance with the first measurement configuration, and transmit the one or more QoE measurements in a measurement report to a serving base station.

Some examples of the method, apparatuses, and non-transitory computer-readable medium described herein may further include operations, features, means, or instructions for identifying one or more application or service IDs associated with the application or service, comparing the determined one or more application or service IDs to a list of IDs stored at the UE, where the list of IDs includes IDs for applications or services associated with the one or more triggering events, and determining that the one or more application or service IDs may be contained in the list of IDs stored at the UE based on the comparing, where the one or more QoE measurements may be performed in accordance with the first measurement configuration based on the determining.

In some examples of the method, apparatuses, and non-transitory computer-readable medium described herein, performing the one or more QoE measurements at the UE in accordance with the first measurement configuration may include operations, features, means, or instructions for verifying, at the UE, that the triggering event for initiating the one or more QoE measurements at the UE may be not associated with the application- or service-specific measurement configuration, where the one or more QoE measurements may be performed in accordance with the first measurement configuration based on the verifying.

Some examples of the method, apparatuses, and non-transitory computer-readable medium described herein may further include operations, features, means, or instructions for determining that the first measurement configuration includes a default measurement configuration for performing the one or more QoE measurements at the UE.

Some examples of the method, apparatuses, and non-transitory computer-readable medium described herein may further include operations, features, means, or instructions for receiving a second measurement configuration that includes an application or services-specific measurement configuration for performing QoE measurements that may be specific to one or more specified applications or services at the UE and performing the QoE measurements at the UE in accordance with the first measurement configuration based on detecting a start of the one or more specified applications or services at the UE.

In some examples of the method, apparatuses, and non-transitory computer-readable medium described herein, the one or more QoE measurements include an application layer throughput measurement, an RTT, a jitter metric, a packet drop rate, or any combination thereof.

Some examples of the method, apparatuses, and non-transitory computer-readable medium described herein may further include operations, features, means, or instructions for receiving the first measurement configuration upon establishing an radio resource control (RRC) connection with the serving base station.

A method for wireless communications at a serving base station is described. The method may include transmitting, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE. In some examples, the method may include receiving, from the UE, the MDT report that includes the MDT measurements or a measurement report that includes one or more QoE measurements, or any combination thereof.

An apparatus for wireless communications at a serving base station is described. The apparatus may include a processor, memory coupled with the processor, and instructions stored in the memory. The instructions may be executable by the processor to cause the apparatus to transmit, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE. In some examples, the instructions may be executable by the processor to cause the apparatus to receive, from the UE, the MDT report that includes the MDT measurements or a measurement report that includes one or more QoE measurements, or any combination thereof.

Another apparatus for wireless communications at a serving base station is described. The apparatus may include means for transmitting, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE. In some examples, the apparatus may include means for receiving, from the UE, the MDT report that includes the MDT measurements or a measurement report that includes one or more QoE measurements, or any combination thereof.

A non-transitory computer-readable medium storing code for wireless communications at a serving base station is described. The code may include instructions executable by a processor to transmit, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE. In some examples, the code may include instructions executable by a processor to receive, from the UE, the MDT report that includes the MDT measurements or a measurement report that includes one or more QoE measurements, or any combination thereof.

Some examples of the method, apparatuses, and non-transitory computer-readable medium described herein may further include operations, features, means, or instructions for identifying one or more application or service IDs associated with the application or service, where the one or more application or service IDs may be contained in a list of IDs stored at the UE and may be associated with the one or more triggering events at the UE.

In some examples of the method, apparatuses, and non-transitory computer-readable medium described herein, receiving the MDT measurements may include operations, features, means, or instructions for receiving one or more localization measurements in the MDT report based on the start of the application or service triggering the obtaining of the one or more localization measurements at the UE.

In some examples of the method, apparatuses, and non-transitory computer-readable medium described herein, receiving the MDT measurements may include operations, features, means, or instructions for receiving one or more QoS measurements included in the MDT report based on the start of the application or service triggering the obtaining of the one or more QoS measurements.

In some examples of the method, apparatuses, and non-transitory computer-readable medium described herein, receiving the one or more QoE measurements may include operations, features, means, or instructions for verifying that the triggering event for initiating the one or more QoE measurements at the UE may be not associated with the application- or service-specific measurement configuration, where the one or more QoE measurements may be received in accordance with the second measurement configuration based on the verifying.

Some examples of the method, apparatuses, and non-transitory computer-readable medium described herein may further include operations, features, means, or instructions for determining that the second measurement configuration includes a default measurement configuration for performing the one or more QoE measurements at the UE.

Some examples of the method, apparatuses, and non-transitory computer-readable medium described herein may further include operations, features, means, or instructions for transmitting a third measurement configuration received from the OAM that includes a UE-specific measurement configuration for QoE measurements that may be specific to one or more specified applications or services at the UE and receiving the QoE measurements from the UE in accordance with the third measurement configuration based on a start of one more specified applications or services at the UE.

In some examples of the method, apparatuses, and non-transitory computer-readable medium described herein, the one or more QoE measurements include an application layer throughput measurement, an RTT, a jitter metric, a packet drop rate, or any combination thereof.

DETAILED DESCRIPTION

Figure 1:
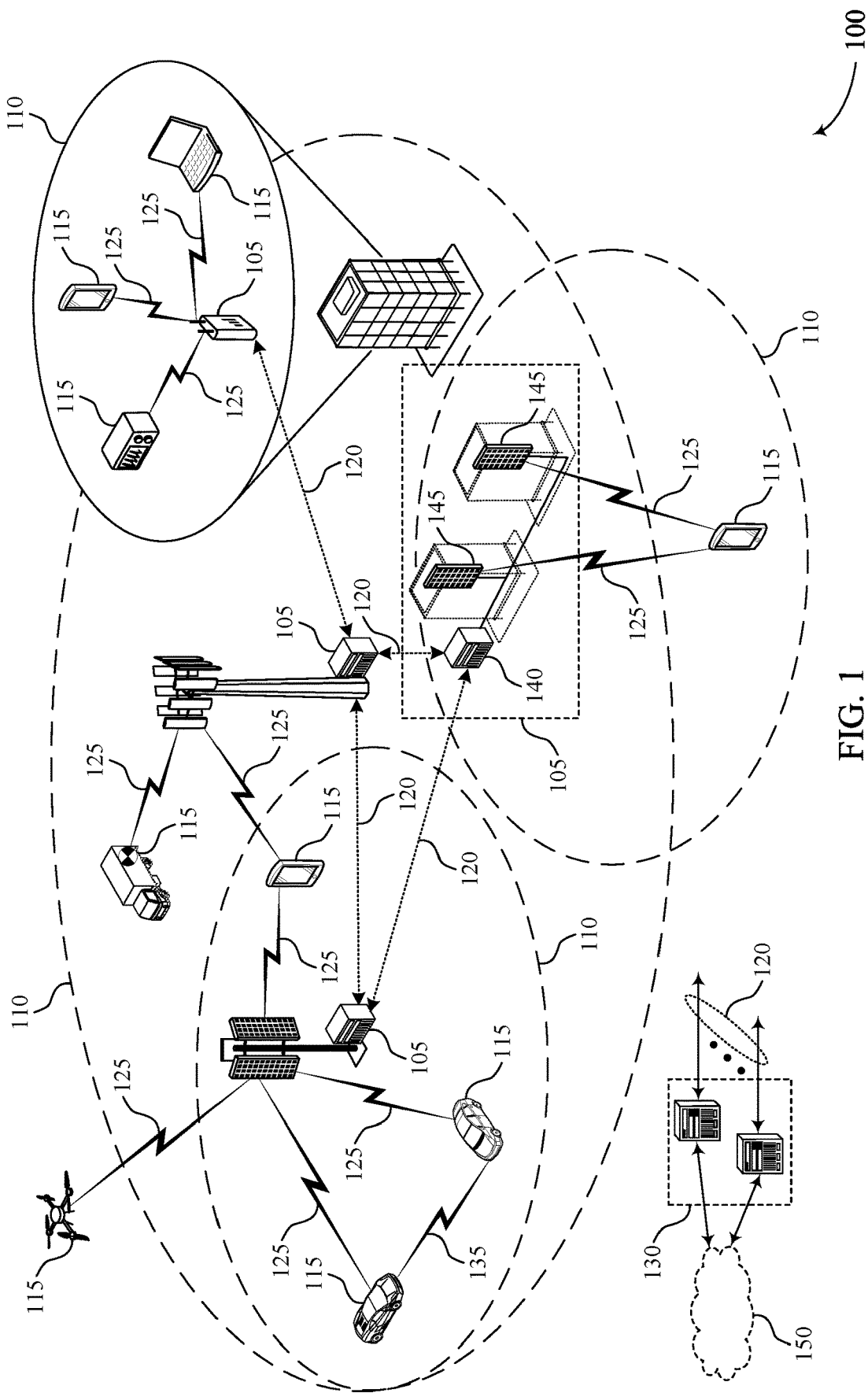
FIG. 1 illustrates an example of a system for wireless communications that supports application, services, and network slice based measurements for minimization of drive test (MDT) reporting in accordance with aspects of the present disclosure.

In some wireless communications systems, devices may support immediate minimization of drive test (MDT) measurements to test and report communications quality in an area to reduce the operational cost and to increase communications quality in the network. Using a measurement configuration, devices such as a user equipment (UE) and a serving base station, may collect various immediate MDT measurements that may be used by the network for quality of service (QoS) verification and other MDT purposes. Additionally, the UE may obtain quality of experience (QoE) measurements to include in a QoE measurement report for application layer QoE verification. The serving base station may obtain the MDT and QoE report from the UE and may report MDT and QoE reports to a centralized server, for example, a trace collection entity (TCE), together with MDT measurements obtained by the serving base station, which may be used to increase communications quality and device performance in the network.

The UE and the serving base station may obtain MDT measurements based on receiving a measurement configuration from the operations, administration, and maintenance (OAM) interface that indicates a number of triggering events for which the UE and the serving base station are to begin MDT measurements. For example, the measurement report may indicate that the start of an application or service at the UE is a triggering event to the serving base station. In response to initialization of application or services, both the UE and the serving base station may obtain MDT measurements. To support MDT reporting among other measurement reporting for various communications and services at the UE, the UE and the serving base station may perform immediate MDT measurements that are triggered by an application or service. In addition, the UE and the serving base station may generate an MDT report for various identified network slices (e.g., radio access network (RAN) slices), for different area configurations, for different times of day, and other network factors. Further, the UE may generate a QoE report based on identifying the start of the application or service. Such immediate measurement and reporting may enhance performance of the applications and services at the UE while increasing overall communications efficiency of the network.

In one implementation, the UE may identify a list of application or service IDs that qualify as measurement collection triggers, and the UE may compare an application or service identifier (ID) to the list of application or service IDs to determine whether to begin MDT measurements. If the application or service identified by the UE is contained in the list of application or service IDs, the UE may obtain MDT measurements and generate an MDT report.

In another implementation, network (e.g., RAN) slicing may provision dedicated resources for the applications and services. As these network slices support different applications and services with different QoS targets, different QoS verification schemes may be implemented for different applications and services. The UE may identify different MDT or QoS reporting for different network slices.

In another implementation, the UE and the serving base station may vary the reporting interval and reporting amount for the MDT measurements based on an area configuration and time of the day. For example, the network may configure the measurement configuration such that the UE and the serving base station adjusts MDT measurement collection for different areas and for different times of the day. For example, the measurement configuration based on different reporting requirements at different times of the day, or for different service areas that have different qualities of service.

In yet another implementation, the UE may be configured to obtain QoE measurements based on application and services triggering. A network may configure a specific QoE configuration for the UE to use to measure QoE based on an application and services trigger. Additionally or alternatively, in cases where the UE is not configured with a specific QoE configuration, the UE may be assigned a generic or specific QoE configuration based on whether the network requests QoE for a specific application or service.

Aspects of the disclosure are initially described in the context of wireless communications systems supporting MDT measurement reporting. Aspects of the disclosure are further illustrated by and described with reference to apparatus diagrams, system diagrams, and flowcharts that relate to application, services, and network slice based measurements for MDT reporting.

FIG. 1 illustrates an example of a wireless communications system 100 that supports application, services, and network slice based measurements for MDT reporting in accordance with aspects of the present disclosure. The wireless communications system 100 may include one or more base stations 105, one or more UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an ID for distinguishing neighboring cells (e.g., a physical cell ID (PCID), a virtual cell ID (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, devices may support immediate MDT measurements to test and report communications quality an area of the network. Using a measurement configuration received from a network entity such as a base station 105, a device such as a UE 115 may collect various MDT measurements, QoE measurements, or any combination thereof to include in an MDT measurement report. The MDT measurement configuration may be used by the serving base station 105 for performing cell specific MDT measurements. Some systems may implement immediate MDT reporting, where the UE 115 may be configured to take measurements and immediately report the measurements to a serving base station 105. The serving base station 105 may then send the measurement trace by combining the measurement report received from the UE 115 and measurement performed by the serving base station 105, which may use the report to increase communications quality and device performance in the network.

The UE 115 and the serving base station 105 may obtain MDT measurements based on receiving a measurement configuration from the OAM that indicates a number of triggering events for which the UE 115 and the serving base station are to begin MDT measurements. For example, the measurement report (e.g., the MDT measurement report or the QoE measurement report) may indicate the start of an application or service at the UE 115 or may indicate information about other triggering events. In one implementation, the UE 115 and the serving base station 105 may identify a list of application or service IDs that qualify as measurement collection triggers, and the UE 115 may compare an application or service ID to the list of application or service IDs to determine whether to begin MDT measurements. In some other implementations, the UE 115 may identify a list of application or service IDs that qualify as measurement collection triggers, and the UE 115 may notify the serving base station 105 to start obtaining the MDT measurements.

In another implementation, network (e.g., RAN) slicing may provision dedicated resources for the applications and services. The UE 115 and the serving base station 105 may identify different MDT or QoS reporting for different network slices. In another implementation, the UE 115 and the serving base station 105 may vary the reporting interval and reporting amount for the MDT measurements based on an area configuration and time of the day. In yet another implementation, the UE 115 may be configured to obtain QoE measurements based on application and services triggering. A network may configure a specific QoE configuration for the UE 115 to use to measure QoE based on an application and services trigger. Additionally or alternatively, in cases where the UE 115 is not configured with a specific QoE configuration, the UE 115 may be assigned a generic or specific QoE configuration.

Figure 2:
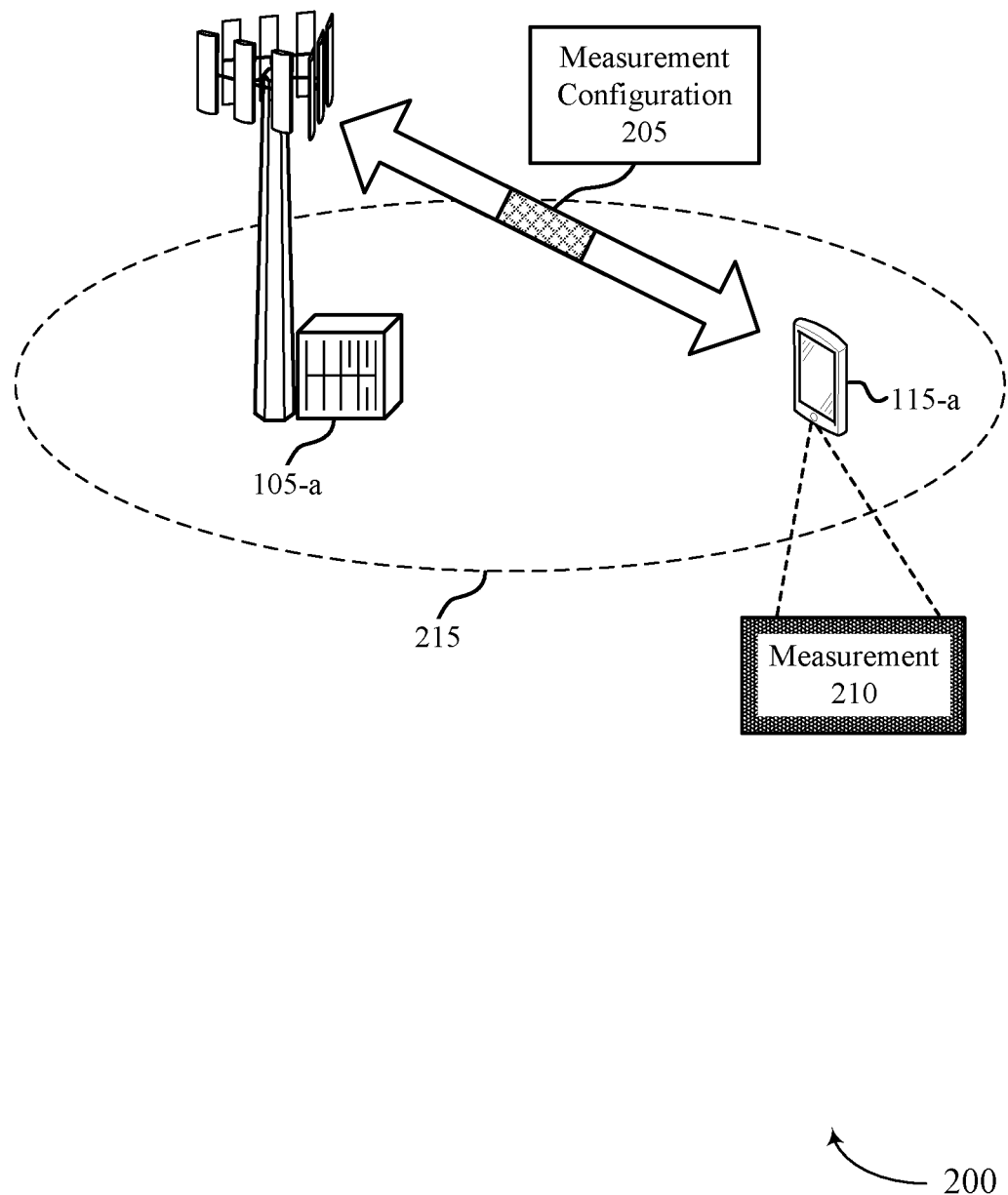
FIG. 2 illustrates an example of a wireless communications system that supports application, services, and network slice based measurements for MDT reporting in accordance with aspects of the present disclosure.

FIG. 2 illustrates an example of a wireless communications system 200 that supports application, services, and network slice based measurements for MDT reporting in accordance with aspects of the present disclosure. In some examples, wireless communications system 200 may implement aspects of wireless communications system 100. For example, wireless communications system may implement signaling between a UE 115-a and a base station 105-a, which may be examples of UEs 115 and base stations 105 described with reference to FIG. 1.

Some wireless communications systems may support devices that perform MDT measurements to test and report communications quality in an area. Using a measurement configuration 205 for performing an MDT, a device located within wireless communications system 200 (such as UE 115-a) may collect various MDT measurements, QoE measurements, or any combination thereof to autonomously increase network performance. In some examples, UE 115-a and serving base station 105-a may collect various immediate MDT measurements that may be used by the network for QoS verification and other MDT purposes. Additionally or alternatively, the UE may obtain QoE measurements thereof to include in a QoE measurement report for application layer QoE verification. The serving base stations 105-a may obtain the MDT and QoE report from the UE 115-a and may report MDT and QoE reports to a TCE together with MDT measurements obtained by the serving base station, which may be used to increase communications quality and device performance in the network. In some aspects, a TCE may be referred to as a server or other terminology. Some systems such as wireless communications system 200 may implement immediate MDT reporting, where UE 115-a may be configured to take measurements and immediately report the measurements to the serving cell (e.g., to a TCE or serving base station 105-a of the wireless communications system 200).

In some communications deployments (e.g., LTE, 5G/NR, among other networks) implementations of MDT may reduce the operational cost and may achieve a higher communications quality at devices within the network. Additionally, in some networks such as wireless communications system 200, devices may support a wide range of applications and services, and QoS verification may be a factor in maintaining high performance and communications quality for the device.

To support MDT reporting among other measurement reporting for various communications and services at the UE 115-a, the UE 115-a perform immediate MDT measurements 210 that are triggered by an application or service. For example, the UE 115-a may obtain MDT measurements and generate an MDT report based on identifying the start or completion of an application or service. In addition, the UE 115-a may generate an MDT report for various identified changes in network slices (e.g., RAN slices), for different area configurations, for different times of day, and other network factors. Further, the UE 115-a may generate a QoE report based on identifying the application or service. Such immediate measurement and reporting may enhance performance of the applications and services at the UE 115-a while increasing overall communications efficiency of the network.

In addition, network (e.g., RAN) slicing may provision dedicated resources for the applications and services. As these network slices support different applications and services with different QoS targets, different QoS verification schemes may be implemented for different applications and services. In such cases, the network may implement different strategies for meeting the QoS targets based on application, services, and network slices. Thus, the additional QoS and MDT reporting may provide the network with additional information about an underlying cause for poor QoE or QoS, and the network may implement various techniques to increase performance.

Wireless communications system 200 may support a number of different measurement types (e.g., M1-M9) for obtaining measurements and reporting for immediate MDT. The UE 115-a may obtain different measurements 210 while the UE 115-a is in an RRC connected state. Different measurements at the UE 115-a may relate to a number of different system level management procedures such as radio resource management (RRM) measurements (e.g., for measurements M1-M2), QoS verification (e.g., for measurement M6 D1, e.g., uplink PDCP delay measurement), and localization purposes (e.g., M8-M9). Additionally, the serving base station 105-a may perform different measurements for different system level management procedures such as RRM (e.g., for measurement M2) and QoS verification (e.g., for measurements M4-M7).

More specifically, the network may support measurement collection triggers for different measurements M1-M9. A first measurement collection trigger (M1) at the UE 115-a includes reference signal received power (RSRP) and reference signal receive quality (RSRQ) measurements. M1 measurements may be associated with periodic and event-triggered measurements ($A_x$, $B_y$ events, as indicated by a standard). $A_x$ events may be representative of specified A1-A6 events that are defined as measurement event triggers, and $B_y$ events may indicate B1 and B2 measurement triggering events. A second measurement collection trigger (M2) at the UE 115-a may include a power headroom report measurement, and may be triggered by the reception of a power headroom report. A third measurement trigger (M3) may be a received interference power measurement. A fourth measurement collection trigger (M4) at the base station 105-a may include a data volume measurement for uplink and downlink communications. A fifth measurement collection trigger (M5) at the base station 105-a may include scheduled internet protocol throughput measurements for uplink and downlink communications. A sixth measurement collection trigger (M6) at the base station and the UE 115-a may include packet delay measurement for uplink and downlink communications. A seventh measurement collection trigger (M7) at the base station 105-a may include packet loss rate measurement for uplink and downlink. An eighth measurement collection trigger (M8) at the UE 115-a may include wireless local area network (WLAN) and Bluetooth received signal strength indicator (RSSI) measurements. A ninth collection trigger (M9) at the UE 115-a may include WLAN round trip time (RTT) measurements.

The M3-M9 measurements, in some cases, may be associated with the end of measurement collection period for MDT measurements. For example, for some wireless networks (e.g., LTE and 5G/NR wireless systems), the end of the measurement period may be between 1024 ms to 1 minute. In some other cases, the OAM or a base station may configure the reporting interval to be from 120 ms to 60 minutes and the reporting amount (1 to infinity) may be defined for the reporting interval.

For triggering the specific MDT measurements (M1-M9), a network may configure applications and services as event triggers. For example, an application and services trigger may be the event trigger for M1 measurement. In addition, application and services may be the event trigger for M8-M9 measurements for localization purposes. Further, application and services may be the event triggered for M4-M7 measurements for QoS verification.

In some examples, the UE 115-a may be configured to identify an event (e.g., "event S") that is a measurement collection trigger associated with the start of an application or service at the UE 115-a. In some cases, a UE 115-a may identify a list of application or service IDs that qualify as measurement collection triggers, and the UE 115-a may compare an application or service ID to the list of application or service IDs to determine whether to begin MDT measurements. For example, the UE application layer at the UE 115-a may report the application ID to the UE modem, and if the list of application or service IDs (e.g., s-Trigger-List) contains the application or service ID, the UE 115-a may perform measurements (e.g., MDT measurements or RRM measurements) based on the list of application or service IDs containing the application ID. Further, the UE 115-a may include the application or service ID in the measurement report upon identifying that it is contained in the list of application or service IDs so that the serving base station may determine what the application or service taking place at the UE 115-a.

The UE 115-a and the base station 105-a may identify a number of measurements to obtain based on an application or service, a network slice, a measurement configuration, etc. The UE 115-a may receive a measurement configuration 205 from the base station 105-a or other network entity such as an OAM, which contains a number of measurements that the UE 115-a may perform and include in the MDT report. The UE 115-a may generate the report based on the measurement configuration 205 and the start of the application or service, and may transmit the report to the base station 105-a (or a network entity such as a TCE).

In some implementations, the network may support QoS verification for applications and services including support for various applications that are associated with tighter QoS service targets such as stringent throughput, delay, and reliability targets. For example, an application may include a streaming service or other service that has high reliability or low latency requirements. In such cases, the start of the application or service may trigger the start of QoS measurements, or communications with a certain network or RAN slice.

In addition, application and services may be the event trigger for M8-M9 measurements for localization purposes. For example, the UE 115-a may determine that the service quality for a given application or service is reduced, and the UE 115-a may use localization reporting to report to the base station 105-a that service quality is decreased. This reporting may also be used at the base station 105-a such that the base station may identify various processes to improve service for the application. Localization information included in the measurement reporting may include the detailed location information, common location information, WLAN location information, Bluetooth location Information, and sensor location information which may be configured for the UE 115-a.

In another implementation, application and services may be the event trigger for M4-M7 measurements for QoS verification processes. For example, the base station 105-a may detect the packets from configured applications or services (or the base station 105-a initiates the applications and services), and the serving base station 105-a or the UE 115-a (or both) may begin collecting MDT measurements 210. In such examples, the UE 115-a may include an application or service ID in the measurement report sent to the base station 105-a, which may prompt the base station 105-a to begin MDT measurement for the application or service indicated by the UE 115-a in the measurement report.

In some cases, the network may regulate the reporting interval and reporting amount for the MDT measurements based on an area configuration and time of the day. For example, the network may configure the measurement configuration 205 such that the UE 115-a and the serving base station 105-a adjusts MDT measurement collection for different areas and for different times of the day. For example, the measurement configuration based on different reporting requirements at different times of the day, or for different service areas that have different qualities of service.

For example, for some MDT measurements, the network may configure the serving base station 105-a and UE 115-a with different reporting interval and reporting frequency based on the area configuration and the time of the day. For a particular area configuration (e.g., a cell 215, a group of gNBs, or a geographic area), the network may configure the UE 115-a and the base station 105-a to obtain the MDT measurements at a first interval (e.g., the interval of 120 ms) and outside this area configuration at a second interval (e.g., at an interval of 1024 ms). The network may similarly configure different reporting intervals and reporting frequencies based on geographical location of the UE 115-a. Additionally, different reporting intervals, reporting frequencies, and number of samples per report may be configured for the different times of the day. For example, the UE 115-a and base station 105-a may collect samples at higher or lower frequencies for MDT measurements based on different times of the day (e.g., based on network traffic or identified events).

In another implementation, a network may implement network-slice based immediate MDT measurements. Different network slices may support different application and services, thus different techniques may be used for QoS verification for the UE 115-a. In some examples, the network may configure the base station 105-a and UE 115-a to obtain immediate MDT measurements for specific network slices. The network may configure a list of network or RAN slices (e.g., S-NSSAI-List) for which the network configures the serving base station 105-a and UE 115-a to obtain immediate MDT measurements. In some other examples, the network may configure the base station 105-a and UE 115-a with different reporting intervals and reporting amounts for different network slices, or the network may prioritize MDT reporting for different RAN slices. For example, the network may configure lower frequency MDT reporting for slices that support low priority data, and higher MDT reporting for slices that support high priority or low latency data.

In another implementation, the UE 115-a may be configured to obtain QoE measurements based on application and services triggering. A network may configure a specific QoE configuration for the UE 115-a to use to measure QoE based on an application and services trigger. Additionally or alternatively, in cases where the UE 115-a is not configured with a specific QoE configuration, the UE 115-*a* may be assigned a generic or specific default QoE configuration. In some other cases, the network may configure the UE 115-*a* with the generic QoE configuration when UE 115-*a* transitions to RRC connected state with a serving base station, and the UE 115-*a* may receive the generic QoE configuration via RRC signaling.

The generic QoE configuration may allow the UE 115-*a* to begin QoE measurements upon the initiation of the application or service. The network may indicate a list of service IDs and application IDs for which configured QoE metric should be collected. This generic QoE configuration may be used to configure the UE 115-*a* for capturing a number of different QoE metrics such as application layer throughput, RTT, Jitter, and packet drop rate (average, excess, or histogram). In some other examples, the network may provide a specific QoE configuration for collecting the measurements for a specific application or service, and the UE 115-*a* may use the new QoE configuration for the specific application or service.

In some examples, the network may request a QoE for a particular service (e.g., a streaming service) at the UE 115-*a*, and may sends a QoE configuration for reporting the QoE for the service. In other cases, the network may provide the UE 115-*a* a QoE configuration as the UE establishes an RRC connection. The generic QoE configuration may include a number of application and service IDs such that whenever the identified application or service starts, the UE 115-*a* may begin taking QoE measurements in accordance with the generic QoE configuration. In some examples, the UE 115-*a* may receive signaling including both a configuration for MDT measurements and a configuration for QoE measurements, for example, from a network entity such as an OAM. In such cases, either configuration may indicate one or more of the triggering events described herein (e.g., a start of an application at the UE 115-*a*, a start of a service at the UE 115-*a*).

Figure 3:
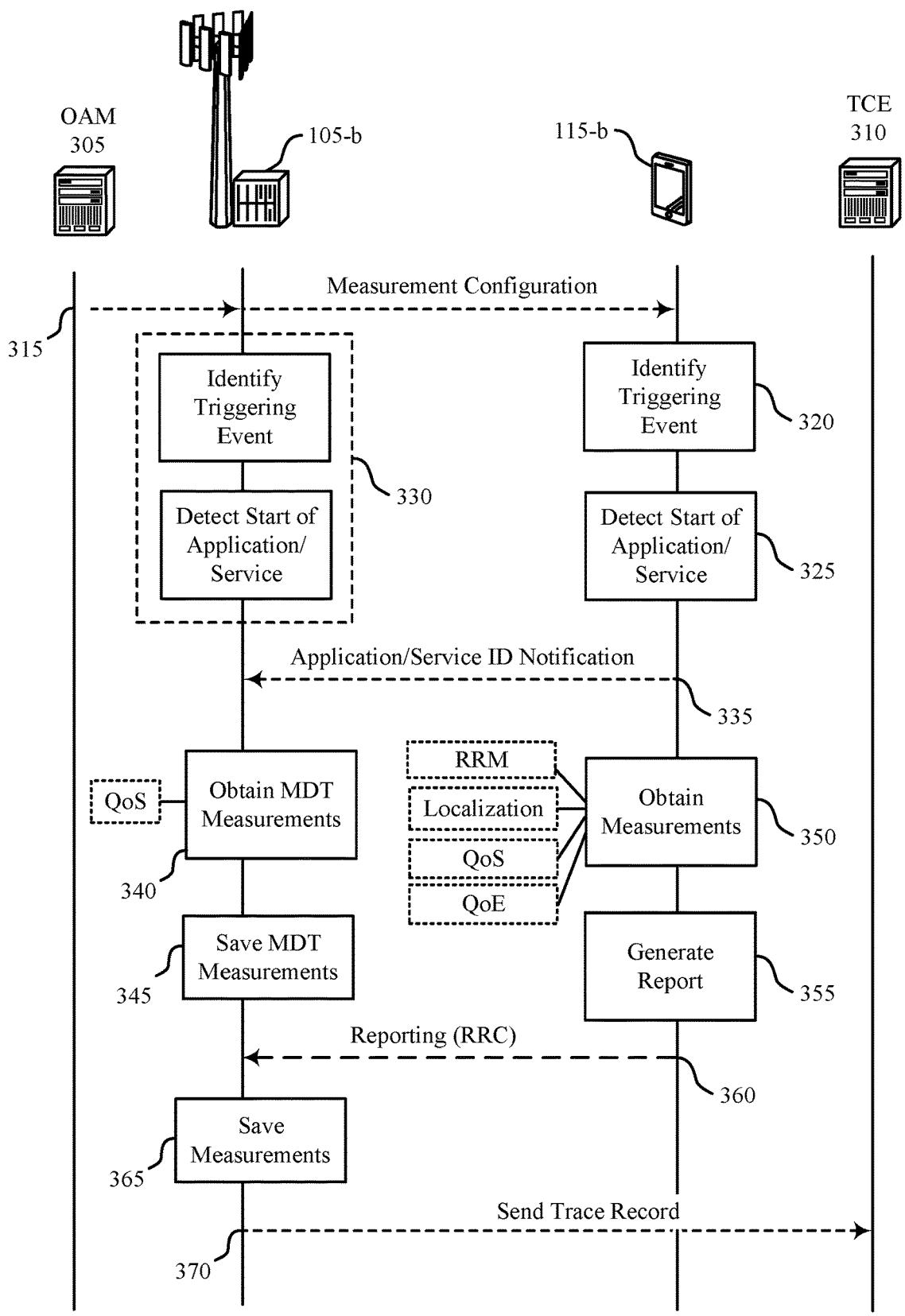
FIG. 3 illustrates an example of a process flow that supports application, services, and network slice based measurements for MDT reporting in accordance with aspects of the present disclosure.

FIG. 3 illustrates an example of a process flow 300 that supports application, services, and network slice based measurements for MDT reporting in accordance with aspects of the present disclosure. In some examples, process flow 300 may implement aspects of wireless communications system 100. For example, process flow 300 may describe communications between an OAM 305, a serving base station 105-*b*, a UE 115-*b*, and a TCE 310. Devices described in FIG. 3 may be examples of devices described with reference to FIGS. 1 and 2, for example base station 105-*b* and UE 115-*b* may be examples of a base station 105 and a UE 115 described with respect to FIGS. 1 and 2.

At 315, the OAM 305 may transmit a measurement configuration to the base station 105-*b*, and the base station 105-*b* may transmit the measurement configuration to the UE 115-*b*. In some examples, the base station 105-*b* may identify that the measurement configuration (e.g., received from an OAM interface) is to be used by the UE 115-*b* to identify a number of measurements to perform and measurements to include in a report (e.g., a MDT report or a QoE report). For example, the measurement configuration may prompt the UE 115-*b* to collect various immediate MDT measurements that may be used by the network for QoS verification and other MDT purposes. Additionally, the UE 115-*b* may obtain various QoE measurements thereof to include in a QoE measurement report for application layer QoE verification. In some examples, the measurement configuration may indicate one or more triggering events such as the start of an application or service at the UE 115-*b*, which, upon occurrence, may trigger MDT measurements at the UE 115-*b*.

At 320, the UE 115-*b* may identify one or more triggering events from the measurement configuration. For example, a triggering event specified by the measurement configuration may be an event that prompts the UE 115-*b* to take MDT measurements to include in a report. A triggering event may be a periodic event or may be one or more individual events specified by the measurement configuration.

At 325, the UE 115-*b* may detect the start of an application or service, which the UE 115-*b* may identify as a triggering event for MDT measurements and QoE measurements based on the reporting configuration. In some cases, the UE 115-*b* may be configured with a list of application IDs and service IDs that may indicate applications or services that may trigger MDT measurements. For example, the UE 115-*b* may identify an application or service ID associated with an application or service is initiated at the UE 115-*b*. The UE 115-*b* may compare the application or service ID to the list of application and service IDs to determine whether the initiated application or service is a triggering event for the UE 115-*b* to obtain MDT measurements. In cases where the initiated application or service ID is contained in the list of application and service IDs, the UE 115-*b* may take MDT measurements and may generate a report to transmit to the base station 105-*b*. In some examples, the UE 115-*b* may include the application or service ID in the report.

At 330, the base station 105-*b* may, in some examples, correspondingly identify the triggering event at the UE 115-*b*, and may detect the start of an application or service at the UE 115-*b* as a triggering event for the MDT measurements.

At 335, the UE 115-*b* may optionally transmit a notification to the base station 105-*b* that includes one or more application or service IDs that are identified at the UE 115-*b*. In some examples, the application or service IDs may be used by the base station 105-*b* as a triggering event to take MDT measurements.

At 340, the base station 105-*b* may obtain MDT measurements based on receiving the notification of one or more application or service IDs from the UE 115-*b*. In some examples, the base station may compare the one or more received application or service IDs to a list of application or service IDs that prompt the base station to obtain MDT measurements. For example, the base station may determine that the one or more application or service IDs are contained in the list of application or service IDs, and may obtain QoS measurements (e.g., a data volume measurement, an internet protocol throughout measurement, a packet delay measurement, a packet loss measurement) based on the determination.

At 345, the base station may save the MDT measurements (e.g., the QoS measurements) obtained based on the detected start of the application or service.

At 350, the UE 115-*b* may obtain the MDT measurements and QoE measurements based on determining that the application or service is a triggering event. In some examples, the UE 115-*b* may obtain RRM measurements (e.g., one or more RSRP or RSRQ measurements) to include in the report based on determining that the application or service ID is contained in the list of stored IDs. The UE 115-*b* may obtain the RRM measurements as periodic or event triggered measurements based on the measurement configuration.

In some other examples, the UE 115-*b* may obtain one or more localization measurements to include in the report based on the start of the application or service being a triggering event for the one or more localization measurements. For example, the UE 115-*b* may obtain the localization measurements as one or more RSSI measurements or RTT measurements. Further, the localization measurements may be associated with common location information, wireless local area network location information, Bluetooth location information, sensor information, or any combination thereof.

In some other examples, the UE 115-*b* may obtain one or more QoS measurements to include in the report based on the start of the application or service triggering the QoS measurements. For example, the UE 115-*b* may obtain one or more packet delay or packet loss rate measurements, or any other QoS metric.

At 355, the UE 115-*b* may generate the report (e.g., the MDT report and the QoE report) in accordance with the measurement configuration and the obtained MDT measurements and QoE measurements. In some examples, the UE 115-*b* may generate the report to include one or more application or service IDs that may prompt the base station to obtain one or more QoS measurements. For example, the base station may obtain a data volume measurement, an internet protocol throughout measurement, a packet delay measurement, a packet loss measurement, or any combination thereof based on the application and service IDs included in the report.

At 360, the UE 115-*b* may transmit the report that includes the MDT measurements and the QoE measurements to the base station 105-*b*. In some examples, the UE 115-*b* may transmit the report via control signaling such as RRC signaling.

At 365, the base station 105-*b* may save the MDT measurements (e.g., the RRM, Localization, QoS measurements, and QoE measurements) transmitted from the UE 115-*b* in the report obtained based on the detected start of the application or service. The base station 105-*b* may save the MDT measurements received from the UE 115-*b* in addition to the saved measurements from obtained by the base station 105-*b*. In some examples, the measurements obtained from the UE 115-*b* may be different from the measurements taken by the base station 105-*b*.

At 370, the base station 105-*b* may transmit the report to a TCE 310. In some examples, the TCE 310 may use information included in the report (e.g., MDT measurements, QoS measurements, QoE measurements) to increase communications quality and device performance in the network.

Figure 4:
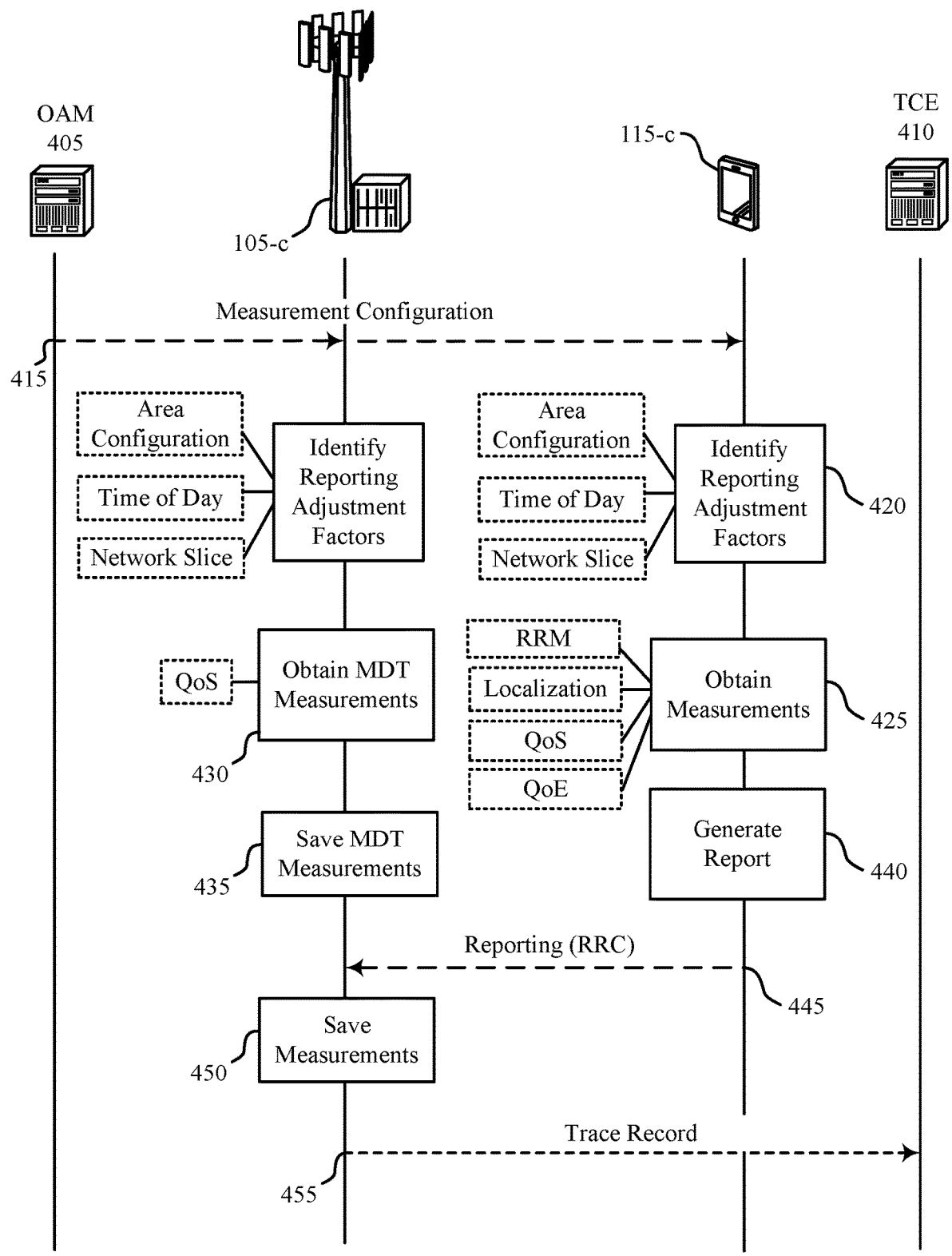
FIG. 4 illustrates an example of a process flow that supports application, services, and network slice based measurements for MDT reporting in accordance with aspects of the present disclosure.

FIG. 4 illustrates an example of a process flow 400 that supports application, services, and network slice based measurements for MDT reporting in accordance with aspects of the present disclosure. In some examples, process flow 400 may implement aspects of wireless communications system 100. For example, process flow 400 may describe communications between an OAM 405, a serving base station 105-*c*, a UE 115-*c*, and a TCE 410. Devices described in FIG. 4 may be examples of devices described with reference to FIGS. 1-3, for example base station 105-*c* and UE 115-*c* may be examples of a base station 105 and a UE 115 described with respect to FIGS. 1-3.

At 415, the OAM 405 may transmit a measurement configuration to the base station 105-*c*, and the base station 105-*c* may transmit the measurement configuration to the UE 115-*c*. In some examples, the base station 105-*c* may identify that the measurement configuration (e.g., received from an OAM interface) is to be used by the UE 115-*c* to identify a number of measurements to perform and measurements to include in a report. For example, the measurement configuration may prompt the UE 115-*b* to collect various immediate MDT measurements that may be used by the network for QoS verification and other MDT purposes. Additionally, the UE 115-*b* may obtain various QoE measurements to include in a QoE measurement report for application layer QoE verification. In some examples, the measurement configuration may include one or more reporting adjustment factors that affect a reporting interval or a reporting amount for reporting the report from the UE 115-*c*.

At 420, the base station 105-*c* and the UE 115-*c* may determine that the one or more reporting adjustment factors for obtaining the MDT measurements are specific to a first area configuration common to the UE 115-*c* and the serving base station 105-*c*. In such examples, the base station 105-*c* and the UE 115-*c* may obtain the MDT measurements in accordance with the reporting adjustment factors specific to the first area configuration. In some other examples, the base station 105-*c* and the UE 115-*c* may identify a second set of reporting adjustment factors specific to a second area configuration, where the second set of reporting adjustment factors are different from the one or more reporting adjustment factors specific to the first area configuration.

In some other examples, the base station 105-*c* and the UE 115-*c* may determine that the one or more reporting adjustment factors for obtaining the MDT measurements are associated with a time of day in which the UE 115-*c* receives the measurement configuration, and the base station 105-*c* and the UE 115-*c* may obtain the MDT measurements in accordance with the reporting adjustment factors associated with the time of day. The reporting adjustment factors associated with a first time of day may in some cases be different from the reporting adjustment factors associated with a second time of day.

In some cases, the reporting adjustment factor may be based on one or more network slices that support communications between the UE 115-*c* and the serving base station 105-*c*. For example, the base station 105-*c* or the UE 115-*c* may identify a first network slice of one or more network slices supporting communications between the UE 115-*c* and the serving base station 105-*c*, and may determine that the first network slice is contained in a list of network slices. The list of network slices may indicate a number of network slices for which the UE 115-*c* and the base station 105-*c* are to obtain the MDT measurements. The base station 105-*c* and the UE 115-*c* may obtain the MDT measurements associated with the first network slice based on the first network slice being contained in the list of network slices.

In addition, the UE 115-*c* may identify one or more reporting adjustment factors associated with the first network slice and a second network slice (e.g., where the first network slice is different from the second network slice), where the reporting adjustment factors associated with the first network slice are different from the reporting adjustment factors associated with the second network slice. In some examples, the serving base station 105-*c* may identity different reporting for different network or RAN slices.

At 425, the UE 115-*c* may obtain MDT measurements and QoE measurements based on the measurement configuration and in accordance with the one or more reporting adjustment factors. The UE 115-*c* may obtain the MDT measurements in accordance with the measurement configuration. In some examples, the UE 115-*c* may obtain RRM measurements (e.g., one or more RSRP or RSRQ measurements) to include in the report based on determining that the application or service ID is contained in the list of stored IDs. The UE 115-c may obtain the RRM measurements as periodic or event triggered measurements based on the measurement configuration.

In some other examples, the UE 115-c may obtain one or more localization measurements to include in the report based on the measurement configuration. For example, the UE 115-c may obtain the localization measurements as one or more RSSI measurements or RTT measurements. Further, the localization measurements may be associated with common location information, wireless local area network location information, Bluetooth location information, sensor information, or any combination thereof.

In some other examples, the UE 115-c may obtain one or more QoS measurements to include in the report based on the start of the application or service triggering the QoS measurements. For example, the UE 115-c may obtain one or more packet delay or packet loss rate measurements, or any other QoS metric.

At 430, the base station 105-c may obtain MDT measurements based on the measurement configuration and the one or more reporting adjustment factors. In some examples, the base station may obtain QoS measurements (e.g., a data volume measurement, an internet protocol throughput measurement, a packet delay measurement, or a packet loss measurement) based on measurement configuration.

At 435, the base station 105-c may save the MDT measurements (e.g., the QoS measurements) obtained in accordance with the reporting adjustment factors.

At 440, the UE 115-c may generate the report at containing the MDT measurements (e.g., RRM, localization, and QoS measurements).

At 445, the UE 115-c may transmit, and the base station 105-c may receive, the report in accordance with the one or more reporting adjustment factors for MDT measurements. In some examples, the UE 115-c may transmit the report using control signaling such as RRC signaling.

At 450, the base station 105-c may save the MDT measurements (e.g., the RRM, localization, and QoS measurements) transmitted from the UE 115-c in the report. The base station 105-c may save the MDT measurements received from the UE 115-c, which may be different from the measurements taken by the base station.

At 455, the base station 105-c may transmit the report to a TCE 410. In some examples, the TCE 410 may use information included in the report (e.g., MDT measurements, QoS measurements, QoE measurements) to increase communications quality and device performance in the network.

Figure 5:
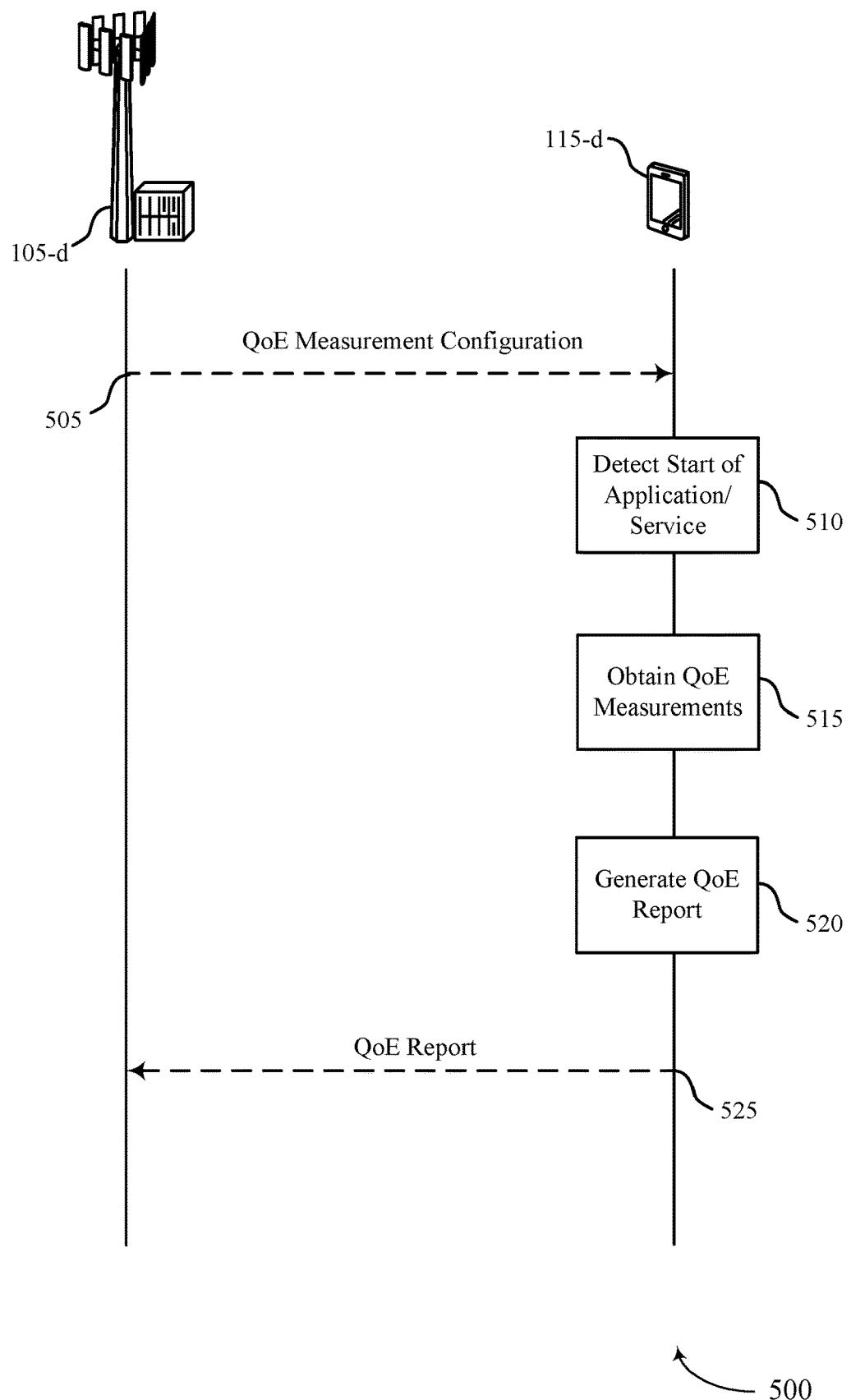
FIG. 5 illustrates an example of a process flow that supports application, services, and network slice based measurements for MDT reporting in accordance with aspects of the present disclosure.

FIG. 5 illustrates an example of a process flow 500 that supports application, services, and network slice based measurements for MDT reporting in accordance with aspects of the present disclosure. In some examples, process flow 500 may implement aspects of wireless communications system 100. For example, process flow 500 may describe communications between a serving base station 105-d and a UE 115-d, which may be examples of a base station 105 and a UE 115 described with respect to FIGS. 1-4.

At 505, base station 105-d may identify a first measurement configuration (e.g., received from an OAM interface) that the UE 115-c may use to identify a number of QoE measurements to perform and an associated number of measurements to include in a QoE report. The base station 105-d may transmit the first measurement configuration to the UE 115-d upon establishing an RRC connection with the UE 115-d, and the UE 115-d may receive the configuration. In some examples, the first measurement configuration may be different from an application- or service-specific measurement configuration identified by the UE 115-d, and may indicate one or more triggering events such as the start of an application or service at the UE 115-d, which, upon occurrence, may trigger the QoE measurements at the UE 115-d.

In some examples, the UE 115-d may verify that the triggering event for initiating the one or more QoE measurements is not associated with the application- or service-specific measurement configuration, and the UE 115-d performs the QoE measurements based on the verifying.

In some examples, the UE 115-d may determine that the first measurement configuration is a default measurement configuration for performing the one or more QoE measurements from the UE. In some implementations, the UE 115-d may be configured with the default QoE measurement configuration independent from receiving the first measurement configuration from the base station.

In some other examples, the UE 115-d may receive a second measurement configuration that includes an application or services-specific measurement configuration for performing a number of QoE measurements that are specific to one or more applications or services specified at the UE 115-d. The UE 115-d may perform the QoE measurements in accordance with the second measurement configuration based on detecting a start of the one or more specified applications or services (e.g., a triggering event). In some examples, the first measurement configuration is different from the second measurement configuration.

At 510, the UE 115-d may identify one or more triggering events from the measurement configuration that prompts the UE 115-d to obtain QoE measurements. For example, the UE 115-d may detect the start of an application or service, which the UE 115-d may identify as a triggering event for QoE measurements based on the first reporting configuration. In some cases, the UE 115-d may be configured with a list of application IDs and service IDs that may indicate applications or services that may trigger QoE measurements. For example, the UE 115-d may identify an application or service ID associated with an application or service is initiated at the UE 115-d. The UE 115-d may compare the application or service ID to the list of application and service IDs to determine whether the initiated application or service is a triggering event for the UE 115-b to obtain QoE measurements.

In cases where the initiated application or service ID is contained in the list of application and service IDs, the UE 115-d may obtain QoE measurements and may generate the report (e.g., at 520). In some examples, the UE 115-d may include the application or service ID in the QoE measurement report. The QoE report may include one or more QoE measurements such as application layer throughput measurements, a measurement of RTT, jitter metrics, a packet drop rate, or any combination thereof.

At 525, the UE 115-d may transmit the one or more QoE measurements in the measurement report to the base station 105-d, where the base station may use the QoE measurements to assess communications quality at the UE 115-d.

Figure 6:
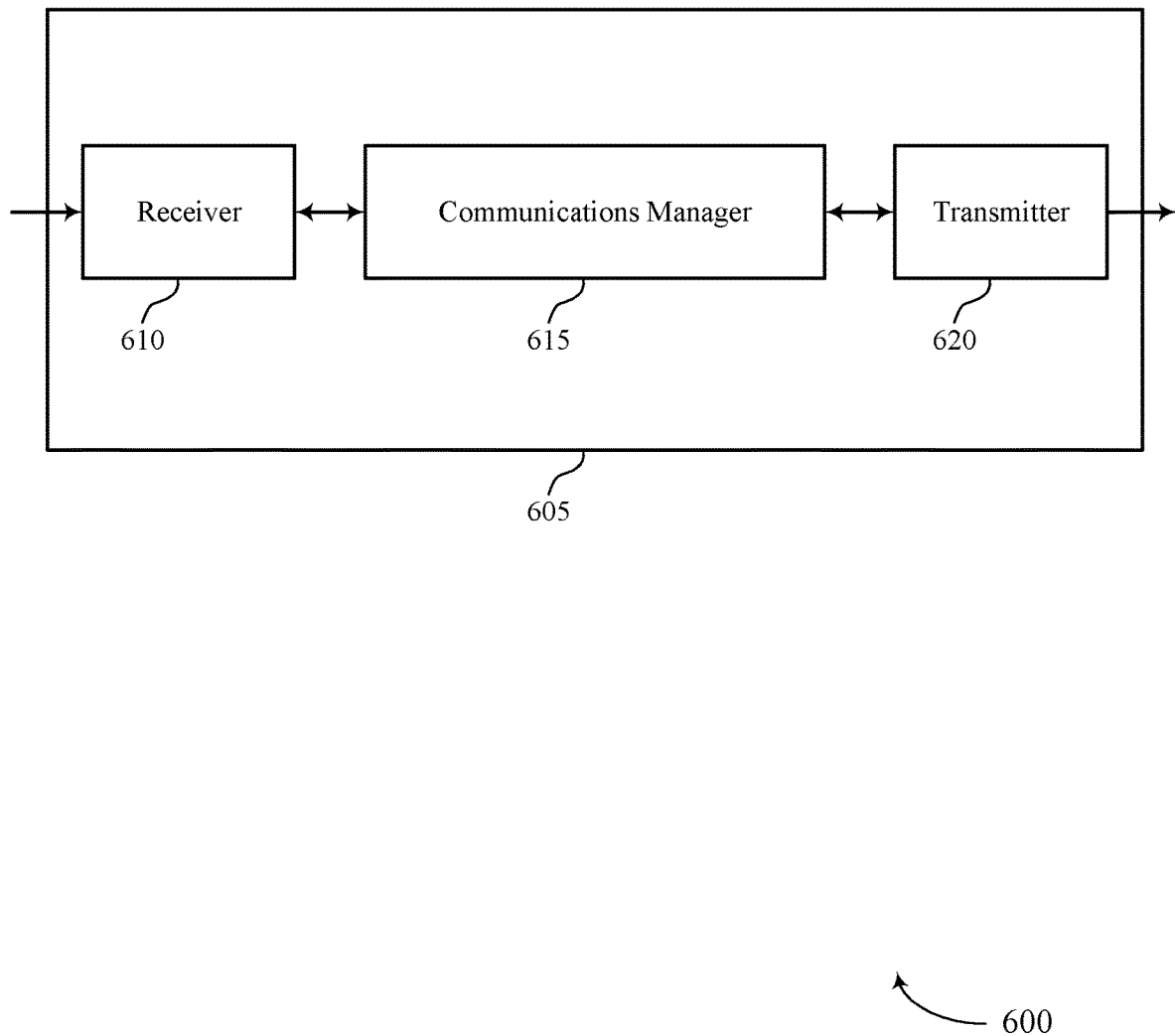
FIGS. 6 and 7 show block diagrams of devices that support application, services, and network slice based measurements for MDT reporting in accordance with aspects of the present disclosure.

FIG. 6 shows a block diagram 600 of a device 605 that supports application, services, and network slice based measurements for MDT reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to application, services, and network slice based measurements for MDT reporting). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from an OAM interface, a measurement configuration for performing MDT measurements to include in a MDT report, identify, from the measurement configuration, one or more triggering events which, upon occurrence, trigger the MDT measurements, detect a start of an application or service at the UE, where the start of the application or service is one of the one or more triggering events, obtain the MDT measurements based on the start of the application or service being one of the one or more triggering events, and transmit, to a TCE, the MDT report that includes the MDT measurements.

The communications manager 615 may receive, from an OAM interface, a measurement configuration for performing MDT measurements to include in a MDT report and QoE measurements to include in a QoE report, identify, from the measurement configuration, one or more triggering events which, upon occurrence, trigger the MDT measurements and the QoE measurements, detect a start of an application or service at the UE, where the start of the application or a service is one of the one or more triggering events, transmitting, to a serving base station, an indication that the one or more triggering events has occurred, obtain the MDT measurements and the QoE measurements based on the start of the application or the service being one of the one or more triggering events, and transmit, to a server, the MDT report and the QoE report that includes the MDT measurements and the QoE measurements.

The communications manager 615 may also receive, from an OAM interface, a measurement configuration for performing MDT measurements to include in a MDT report, identify, from the measurement configuration, one or more reporting adjustment factors which affect at least one of a reporting interval or a reporting amount for reporting the MDT report, obtain the MDT measurements based on the measurement configuration and in accordance with the one or more reporting adjustment factors, and transmit, to a TCE, the MDT report in accordance with the one or more reporting adjustment factors.

The communications manager 615 may also receive, from an OAM interface, a first measurement configuration for performing one or more QoE measurements at the UE, the first measurement configuration being different from an application- or service-specific measurement configuration, detect a start of an application or service at the UE, where the start of the application or service is a triggering event for initiating the one or more QoE measurements at the UE, perform the one or more QoE measurements at the UE in accordance with the first measurement configuration, and transmit the one or more QoE measurements in a measurement report to a serving base station. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
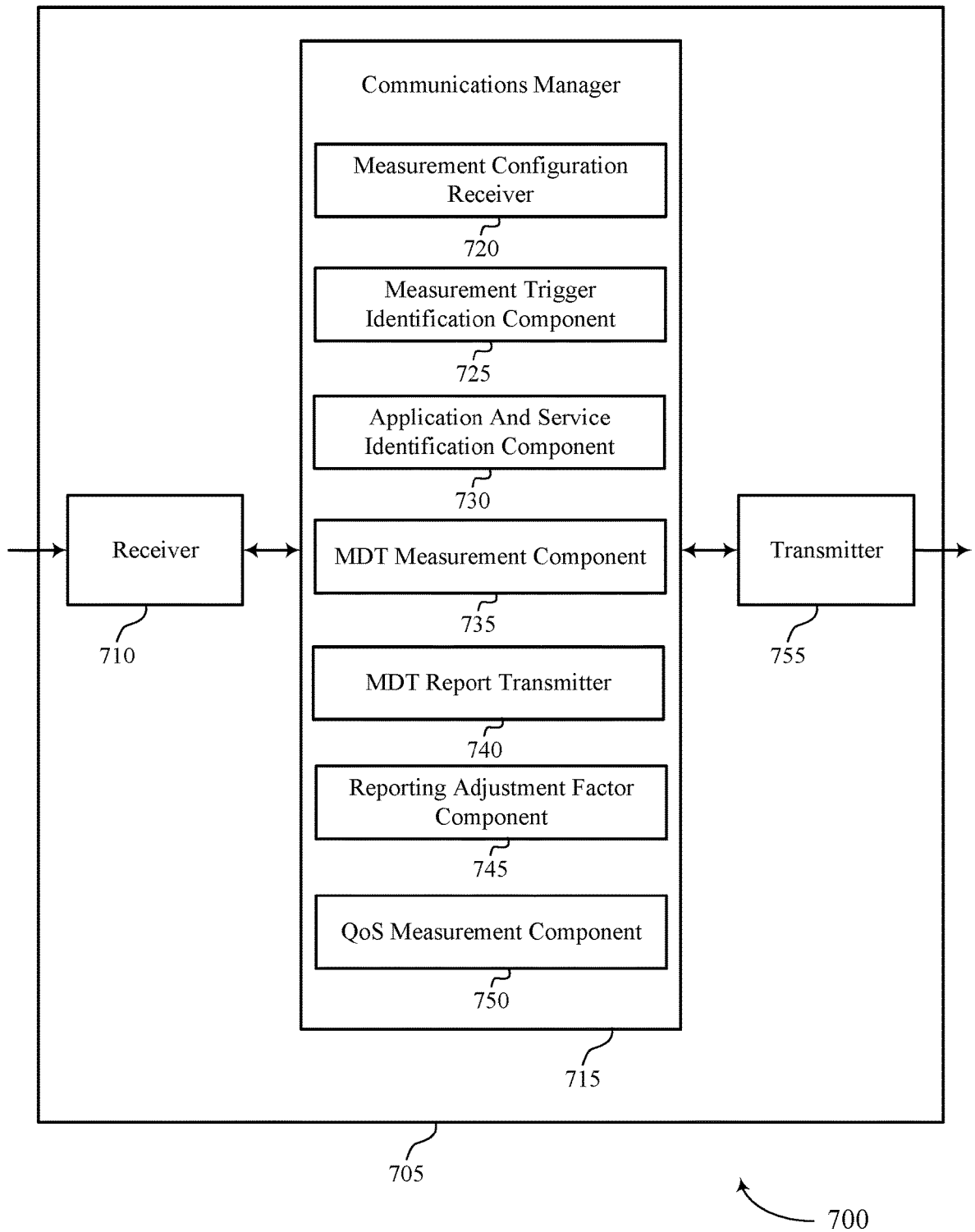

FIG. 7 shows a block diagram 700 of a device 705 that supports application, services, and network slice based measurements for MDT reporting in accordance with aspects of the present disclosure. The device 705 may be an example of aspects of a device 605, or a UE 115 as described herein. The device 705 may include a receiver 710, a communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to application, services, and network slice based measurements for MDT reporting). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a measurement configuration receiver 720, a measurement trigger identification component 725, an application and service identification component 730, a MDT measurement component 735, a MDT report transmitter 740, a reporting adjustment factor component 745, and a QoS measurement component 750. The communications manager 715 may be an example of aspects of the communications manager 910 described herein.

The measurement configuration receiver 720 may receive, from an OAM interface, a measurement configuration for performing MDT measurements to include in a MDT report. In some examples, the measurement configuration receiver 720 may receive from an OAM interface, a measurement configuration for performing MDT measurements to include in an MDT test report and QoE measurements to include in a QoE report.

The measurement trigger identification component 725 may identify, from the measurement configuration, one or more triggering events which, upon occurrence, trigger the MDT measurements. In some examples, the measurement trigger identification component 725 may identify, from the measurement configuration, one or more triggering events which, upon occurrence, trigger the MDT measurements and the QoE measurements.

The application and service identification component 730 may detect a start of an application or a service at the UE, where the start of the application or service is one of the one or more triggering events. In some examples, the application and service identification component 730 may transmit, to a serving base station, an indication that the one or more triggering events has occurred.

The MDT measurement component 735 may obtain the MDT measurements based at least in part on the start of the application or the service being one of the one or more triggering events. In some examples, the MDT measurement component 735 may obtain the MDT measurements and the QoE measurements based at least in part on the start of the application or the service being the one of the one or more triggering events.

The MDT report transmitter 740 may transmit, to a TCE, the MDT report that includes the MDT measurements. In some examples, the MDT report transmitted 740 may transmit, to a server, the MDT test and the QoE report that includes the MDT measurements and the QoE measurements.

The measurement configuration receiver 720 may receive, from an OAM interface, a measurement configuration for performing MDT measurements to include in a MDT report.

The reporting adjustment factor component 745 may identify, from the measurement configuration, one or more reporting adjustment factors which affect at least one of a reporting interval or a reporting amount for reporting the MDT report.

The MDT measurement component 735 may obtain the MDT measurements based on the measurement configuration and in accordance with the one or more reporting adjustment factors.

The MDT report transmitter 740 may transmit, to a TCE, the MDT report in accordance with the one or more reporting adjustment factors.

The measurement configuration receiver 720 may receive, from an OAM interface, a first measurement configuration for performing one or more QoE measurements at the UE, the first measurement configuration being different from an application- or service-specific measurement configuration.

The measurement trigger identification component 725 may detect a start of an application or service at the UE, where the start of the application or service is a triggering event for initiating the one or more QoE measurements at the UE.

The QoS measurement component 750 may perform the one or more QoE measurements at the UE in accordance with the first measurement configuration and transmit the one or more QoE measurements in a measurement report to a serving base station.

The transmitter 755 may transmit signals generated by other components of the device 705. In some examples, the transmitter 755 may be collocated with a receiver 710 in a transceiver module. For example, the transmitter 755 may be an example of aspects of the transceiver 920 described with reference to FIG. 9. The transmitter 755 may utilize a single antenna or a set of antennas.

In some examples, communications manager 715 may be implemented as an integrated circuit or chipset for a mobile device modem, and the receiver 710 and transmitter 755 may be implemented as analog components (e.g., amplifiers, filters, or antennas) coupled with the mobile device modem to enable wireless transmission and reception.

The communications manager 715 as described herein may be implemented to realize one or more potential advantages. Various implementations may enable the communications manager 715 to. At least one implementation may enable communications manager 715 to effectively identify the start of an application or service for triggering generation of an MDT report for the device 705. In some other implementations, the communications manager 715 may adjust the reporting amount or duration for QoS measurements based on identified network conditions, network area, time of day, network slicing, among other factors.

Based on implementing the MDT reporting techniques as described herein, one or more processors of the device 705 (e.g., processor(s) controlling or incorporated with one or more of receiver 710, communications manager 715, and transmitter 755) may increase communications quality for applications and services and for various network conditions. In addition, the techniques described herein may enhance autonomous reporting for devices upon the identifying of a triggering event or upon identifying a need for reporting events associated with reduced communications quality.

Figure 8:
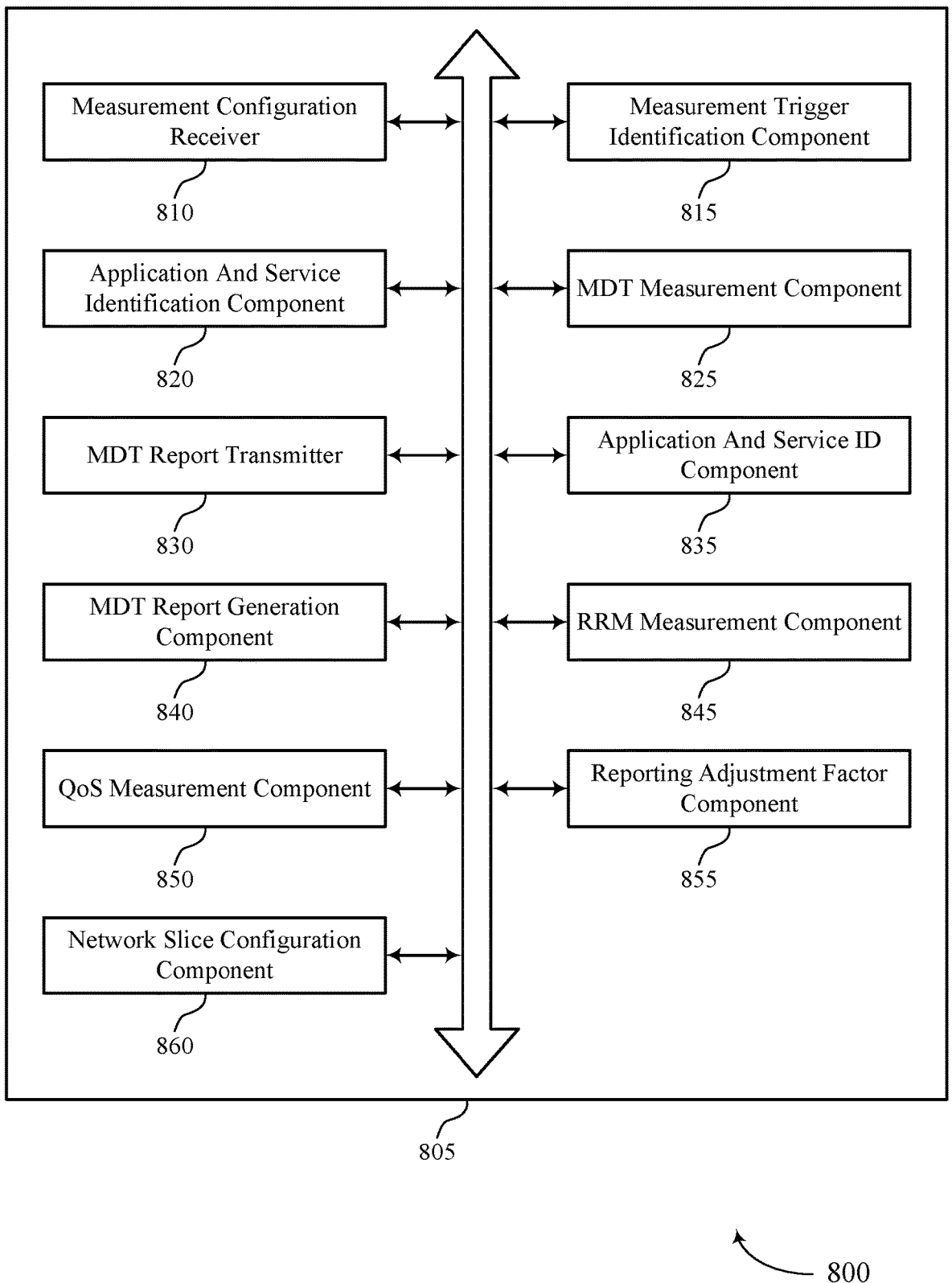
FIG. 8 shows a block diagram of a communications manager that supports application, services, and network slice based measurements for MDT reporting in accordance with aspects of the present disclosure.

FIG. 8 shows a block diagram 800 of a communications manager 805 that supports application, services, and network slice based measurements for MDT reporting in accordance with aspects of the present disclosure. The communications manager 805 may be an example of aspects of a communications manager 615, a communications manager 715, or a communications manager 910 described herein. The communications manager 805 may include a measurement configuration receiver 810, a measurement trigger identification component 815, an application and service identification component 820, a MDT measurement component 825, a MDT report transmitter 830, an application and service ID component 835, a MDT report generation component 840, a RRM measurement component 845, a QoS measurement component 850, a reporting adjustment factor component 855, and a network slice configuration component 860. Each of these modules may communicate, directly or indirectly, with one another (e.g., via one or more buses).

The measurement configuration receiver 810 may receive, from an OAM interface, a measurement configuration for performing MDT measurements to include in a MDT report. In some examples, the measurement configuration receiver 810 may receive from an OAM interface, a measurement configuration for performing MDT measurements to include in an MDT test report and QoE measurements to include in a QoE report In some examples, the measurement configuration receiver 810 may receive, from an OAM interface, a measurement configuration for performing MDT measurements to include in a MDT report.

In some examples, the measurement configuration receiver 810 may receive a second measurement configuration that includes an application or services-specific measurement configuration for performing QoE measurements that are specific to one or more specified applications or services at the UE.

The measurement trigger identification component 815 may identify, from the measurement configuration, one or more triggering events which, upon occurrence, trigger the MDT measurements. In some examples, the measurement configuration receiver 815 may receive from an OAM interface, a measurement configuration for performing MDT measurements to include in an MDT test report and QoE measurements to include in a QoE report. In some examples, the measurement trigger identification component 815 may detect a start of an application or service at the UE, where the start of the application or service is a triggering event for initiating the one or more QoE measurements at the UE. The MDT measurement component 825 may obtain the MDT measurements based at least in part on the start of the application or service being one of the one or more triggering events. In some examples, the MDT measurement component 825 may obtain the MDT measurements and the QoE measurements based at least in part on the start of the application or the service being the one of the one or more triggering events.

In some examples, the MDT measurement component 825 may obtain the MDT measurements based on the measurement configuration and in accordance with the one or more reporting adjustment factors.

In some examples, the MDT measurement component 825 may obtain one or more localization measurements to include in the MDT report based on the start of the application or service triggering the obtaining of the one or more localization measurements. In some examples, the MDT measurement component 825 may obtain localization measurements as one or more RSSI measurements or RTT measurements, where the localization measurements are associated with common location information, wireless local area network location information, Bluetooth location information, sensor information, or any combination thereof.

The MDT report transmitter 830 may transmit, to a TCE, the MDT report that includes the MDT measurements. In some examples, the MDT report transmitted 830 may transmit, to a server, the MDT test and the QoE report that includes the MDT measurements and the QoE measurements.

In some examples, the QoS measurement component 850 may receive the first measurement configuration upon establishing an RRC connection with the serving base station.

The QoS measurement component 850 may perform the one or more QoE measurements at the UE in accordance with the first measurement configuration. In some examples, the QoS measurement component 850 may transmit the one or more QoE measurements in a measurement report to a serving base station.

In some examples, the QoS measurement component 850 may obtain one or more QoS measurements to include in the MDT report based on the start of the application or service triggering the obtaining of the one or more QoS measurements. In some examples, the QoS measurement component 850 may perform the QoE measurements at the UE in accordance with the second measurement configuration based on detecting a start of the one or more specified applications or services at the UE. In some cases, the one or more QoS measurements include one or more packet delay measurements or packet loss rate measurements. In some cases, the QoS measurements by the serving base station include a data volume measurement, an internet protocol throughout measurement, a packet delay measurement, a packet loss measurement, or any combination thereof.

The reporting adjustment factor component 855 may identify, from the measurement configuration, one or more reporting adjustment factors which affect at least one of a reporting interval or a reporting amount for reporting the MDT report. In some examples, the reporting adjustment factor component 855 may determine that the one or more reporting adjustment factors for obtaining the MDT measurements are specific to a first area configuration common to the UE and a serving base station, where the MDT measurements are obtained in accordance with the reporting adjustment factors specific to the first area configuration.

In some examples, the reporting adjustment factor component 855 may identify a second set of reporting adjustment factors specific to a second area configuration, where the second set of reporting adjustment factors are different from the one or more reporting adjustment factors specific to the first area configuration. In some examples, the reporting adjustment factor component 855 may determine that the one or more reporting adjustment factors for obtaining the MDT measurements are associated with a time of day in which the UE receives the measurement configuration. In some examples, the reporting adjustment factor component 855 may obtain the MDT measurements in accordance with the reporting adjustment factors associated with the time of day.

In some examples, the reporting adjustment factor component 855 may identify one or more reporting adjustment factors associated with the first network slice and a second network slice, where the reporting adjustment factors associated with the first network slice are different from the reporting adjustment factors associated with the second network slice. In some cases, the one or more reporting adjustment factors at a first time of day are different from the one or more reporting adjustment factors at a second time of day. In some examples, the MDT report transmitter 830 may transmit, to a TCE, the MDT report in accordance with the one or more reporting adjustment factors.

The application and service ID component 835 may identify one or more application or service IDs associated with the application or service. In some examples, comparing the one or more application or service IDs to a list of IDs stored at the UE, where the list of IDs includes IDs for applications or services associated with the one or more triggering events. In some examples, the application and service ID component 835 may determine that the one or more application or service IDs is contained in the list of IDs stored at the UE based on the comparing.

In some examples, the application and service ID component 835 may receive, in the measurement configuration, an indication that the UE is to include one or more application or service IDs in the MDT report, where the one or more application or service IDs prompt QoS measurements by a serving base station. In some examples, the application and service ID component 835 may identify one or more application or service IDs (IDs) associated with the application or service. In some examples, the application and service ID component 835 may compare the determined one or more application or service IDs to a list of IDs stored at the UE, where the list of IDs includes IDs for applications or services associated with the one or more triggering events.

In some examples, the application and service ID component 835 may determine that the one or more application or service IDs is contained in the list of IDs stored at the UE based on the comparing. The MDT report generation component 840 may generate a MDT report to include the one or more application or service IDs based on determining that the one or more application or service IDs is contained in the list of IDs stored at the UE. In some examples, the application and service ID component 835 may generate the MDT report and the QoE report to include the one or more application or service IDs based at least in part on determining that the one or more application or service IDs is contained in the list of IDs stored at the UE. The RRM measurement component 845 may obtain RRM measurements to include in the MDT report based on determining that the one or more application or service IDs is contained in the list of IDs stored at the UE. In some cases, the RRM measurements include at least one of a RSRP measurement or a RSRQ measurement. In some cases, the RRM measurements include periodic measurements, event-triggered measurements, or a combination thereof.

The network slice configuration component 860 may identify a first network slice of one or more network slices supporting communications between the UE and the serving base station. In some examples, the network slice configuration component 860 may determine that the first network slice is contained in a list of network slices, where the list of network slices indicates network slices for which the UE and a serving BS are to obtain the MDT measurements, where the MDT measurements associated with the first network slice are obtained based on the first network slice being contained in the list of network slices.

In some examples, the measurement configuration receiver 810 may receive, from an OAM interface, a first measurement configuration for performing one or more QoE measurements at the UE, the first measurement configuration being different from an application- or service-specific measurement configuration. In some examples, the measurement configuration receiver 810 may determine that the first measurement configuration includes a default measurement configuration for performing the one or more QoE measurements at the UE.

In some examples, the measurement trigger identification component 815 may verify, at the UE, that the triggering event for initiating the one or more QoE measurements at the UE is not associated with the application- or service-specific measurement configuration, where the one or more QoE measurements are performed in accordance with the first measurement configuration based on the verifying. The application and service identification component 820 may detect a start of an application or service at the UE, where the start of the application or service is one of the one or more triggering events. In some examples, the application and service identification component 820 may transmit, to a serving base station, an indication that the one or more triggering events has occurred. In some cases, the one or more QoE measurements are performed in accordance with the first measurement configuration based on the determining. In some cases, the one or more QoE measurements include an application layer throughput measurement, a RTT, a jitter metric, a packet drop rate, or any combination thereof.

Figure 9:
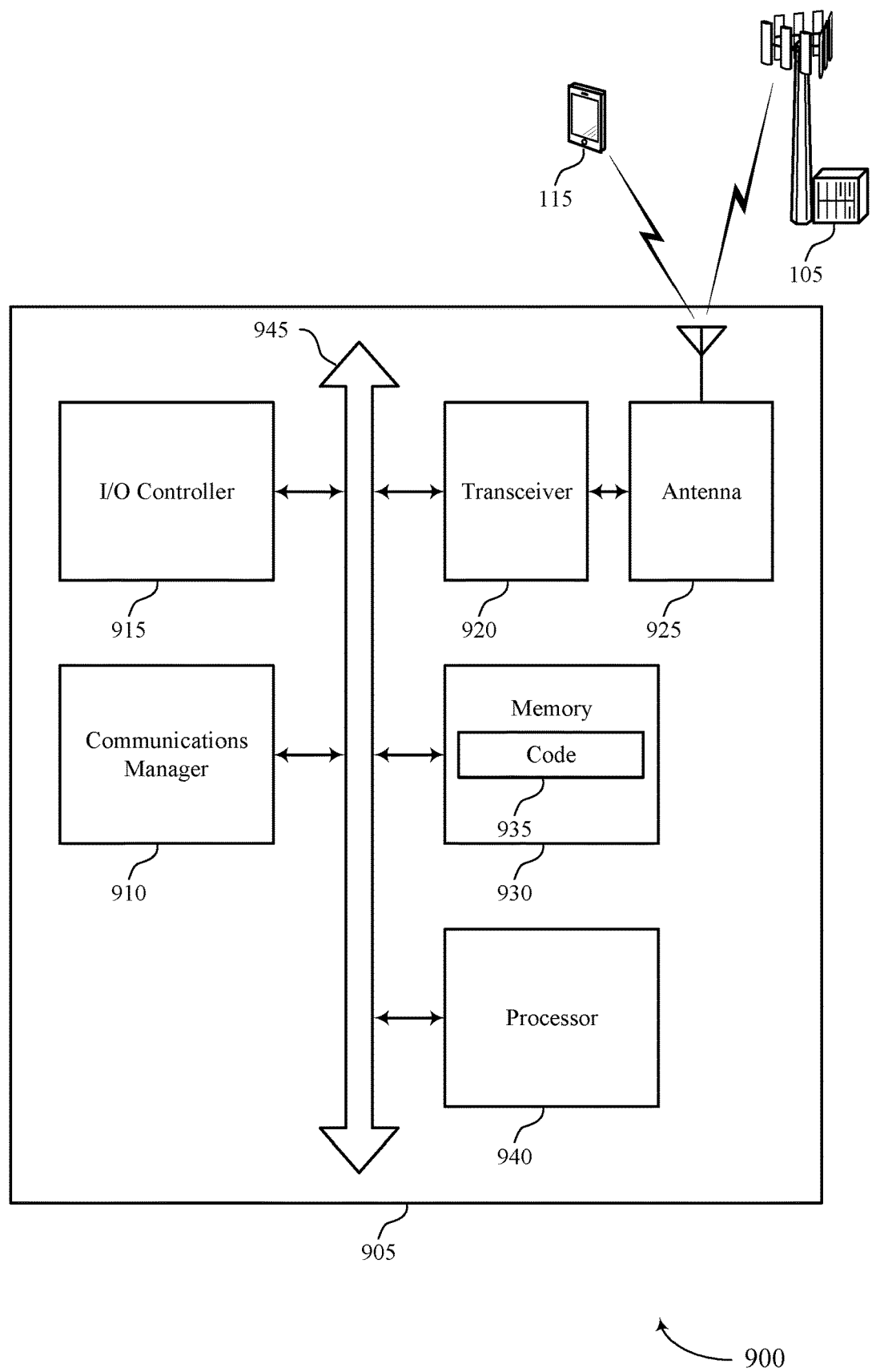
FIG. 9 shows a diagram of a system including a device that supports application, services, and network slice based measurements for MDT reporting in accordance with aspects of the present disclosure.

FIG. 9 shows a diagram of a system 900 including a device 905 that supports application, services, and network slice based measurements for MDT reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be coupled via one or more buses (e.g., bus 945).

The communications manager 910 may receive, from an OAM interface, a measurement configuration for performing MDT measurements to include in a MDT report, identify, from the measurement configuration, one or more triggering events which, upon occurrence, trigger the MDT measurements, detect a start of an application or service at the UE, where the start of the application or service is one of the one or more triggering events, obtain the MDT measurements based at least in part on the start of the application or service being one of the one or more triggering events, and transmit, to a TCE, the MDT report that includes the MDT measurements.

The communications manager 910 may receive, from an OAM interface, a measurement configuration for performing MDT measurements to include in a MDT report and QoE measurements to include in a QoE report, identify, from the measurement configuration, one or more triggering events which, upon occurrence, trigger the MDT measurements and the QoE measurements, detect a start of an application or service at the UE, where the start of the application or a service is one of the one or more triggering events, transmitting, to a serving base station, an indication that the one or more triggering events has occurred, obtain the MDT measurements and the QoE measurements based on the start of the application or the service being one of the one or more triggering events, and transmit, to a server, the MDT report and the QoE report that includes the MDT measurements and the QoE measurements.

The communications manager 910 may also receive, from an OAM interface, a measurement configuration for performing MDT measurements to include in a MDT report, identify, from the measurement configuration, one or more reporting adjustment factors which affect at least one of a reporting interval or a reporting amount for reporting the MDT report, obtain the MDT measurements based on the measurement configuration and in accordance with the one or more reporting adjustment factors, and transmit, to a TCE, the MDT report in accordance with the one or more reporting adjustment factors.

The communications manager 910 may also receive, from an OAM interface, a first measurement configuration for performing one or more QoE measurements at the UE, the first measurement configuration being different from an application- or service-specific measurement configuration, detect a start of an application or service at the UE, where the start of the application or service is a triggering event for initiating the one or more QoE measurements at the UE, perform the one or more QoE measurements at the UE in accordance with the first measurement configuration, and transmit the one or more QoE measurements in a measurement report to a serving base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting application, services, and network slice based measurements for MDT reporting).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
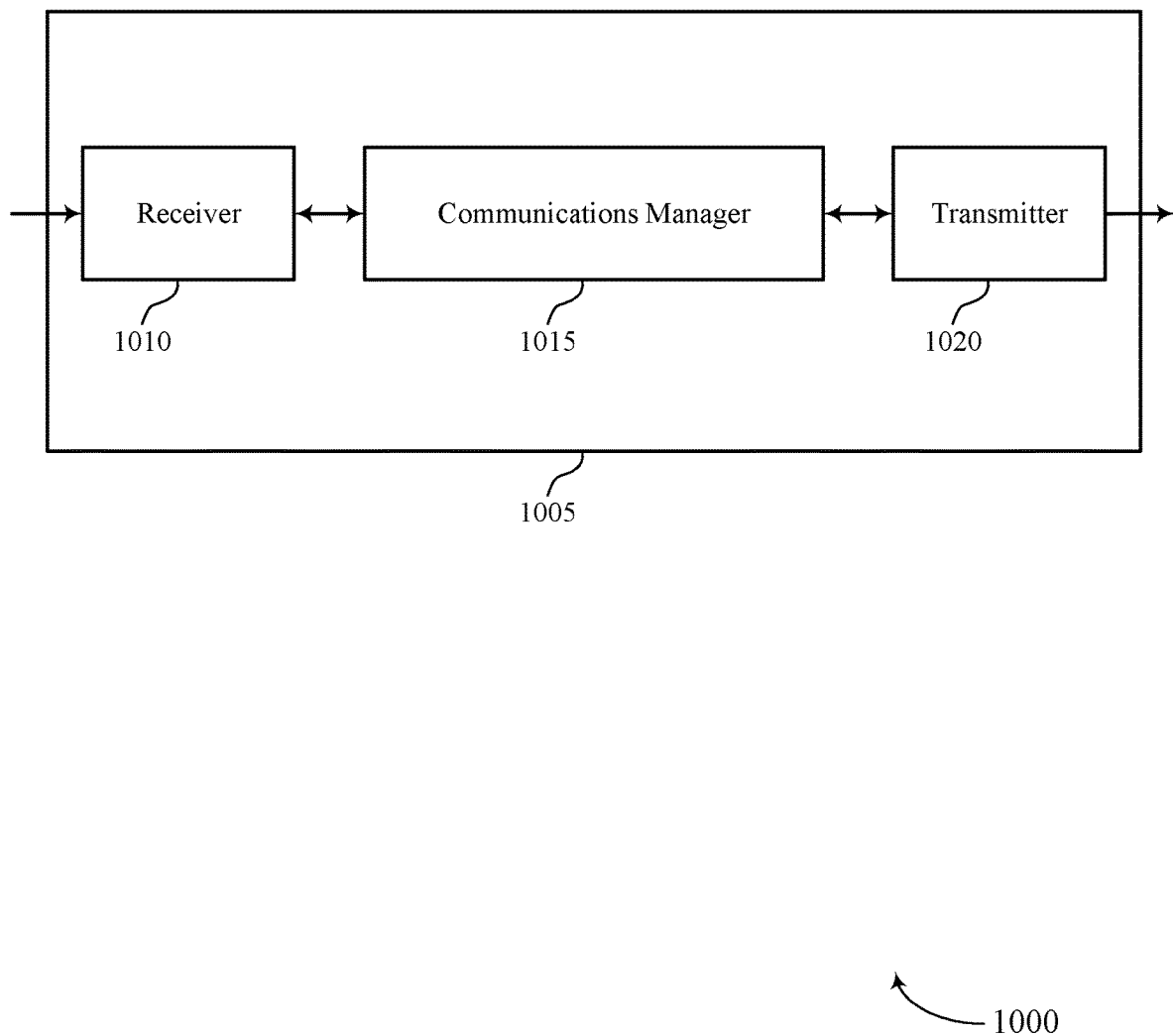
FIGS. 10 and 11 show block diagrams of devices that support application, services, and network slice based measurements for MDT reporting in accordance with aspects of the present disclosure.

FIG. 10 shows a block diagram 1000 of a device 1005 that supports application, services, and network slice based measurements for MDT reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to application, services, and network slice based measurements for MDT reporting). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a measurement configuration received from an OAM interface for performing the MDT measurements to include in a MDT report, the measurement configuration indicating one or more triggering events including the start of an application or service at the UE which, upon occurrence, trigger the MDT measurements at the UE and receive, from the UE, the MDT report that includes the MDT measurements. The communications manager 1015 may also transmit, to a UE a measurement configuration received from an OAM interface for performing MDT measurements to include in a MDT report, the measurement configuration including one or more reporting adjustment factors which affect at least one of a reporting interval or a reporting amount for reporting the MDT report and receive, from the UE, the MDT report in accordance with the one or more reporting adjustment factors. The communications manager 1015 may also transmit, to a UE, a first measurement configuration received from an OAM interface for performing one or more QoE measurements at the UE, the first measurement configuration being different from an application- or service-specific measurement configuration, where the first measurement configuration indicates a triggering event for initiating the one or more QoE measurements at the UE as the start of the application or service and receive the one or more QoE measurements in a measurement report from the UE.

The communications manager 1015 may also transmit, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE, and receive, from the UE, the MDT report that includes the MDT measurements or a measurement report that includes one or more QoE measurements. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
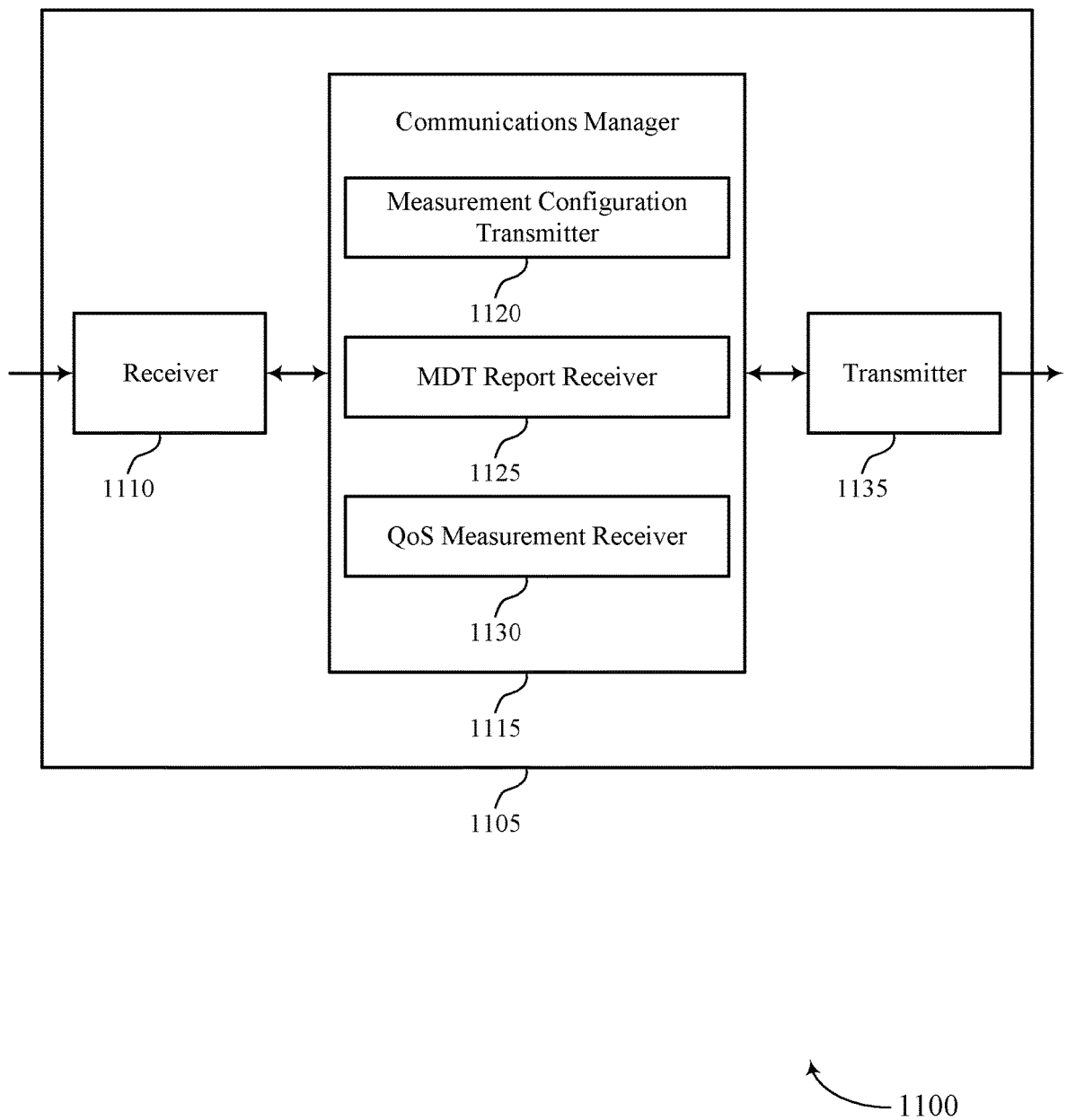

FIG. 11 shows a block diagram 1100 of a device 1105 that supports application, services, and network slice based measurements for MDT reporting in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to application, services, and network slice based measurements for MDT reporting). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a measurement configuration transmitter 1120, a MDT report receiver 1125, and a QoS measurement receiver 1130. The communications manager 1115 may be an example of aspects of the communications manager 1310 described herein.

The measurement configuration transmitter 1120 may transmit, to a UE, a measurement configuration received from an OAM interface for performing the MDT measurements to include in a MDT report, the measurement configuration indicating one or more triggering events including the start of an application or service at the UE which, upon occurrence, trigger the MDT measurements at the UE.

The MDT report receiver 1125 may receive, from the UE, the MDT report that includes the MDT measurements.

The measurement configuration transmitter 1120 may transmit, to a UE a measurement configuration received from an OAM interface for performing MDT measurements to include in a MDT report, the measurement configuration including one or more reporting adjustment factors which affect at least one of a reporting interval or a reporting amount for reporting the MDT report.

The MDT report receiver 1125 may receive, from the UE, the MDT report in accordance with the one or more reporting adjustment factors.

The measurement configuration transmitter 1120 may transmit, to a UE, a first measurement configuration received from an OAM interface for performing one or more QoE measurements at the UE, the first measurement configuration being different from an application- or service-specific measurement configuration, where the first measurement configuration indicates a triggering event for initiating the one or more QoE measurements at the UE as the start of the application or service.

The QoS measurement receiver 1130 may receive the one or more QoE measurements in a measurement report from the UE.

The measurement configuration transmitter 1120 may transmit, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE.

The MDT report receiver 1125 may receive, from the UE, the MDT report that includes the MDT measurements or a measurement report that includes one or more QoE measurements.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
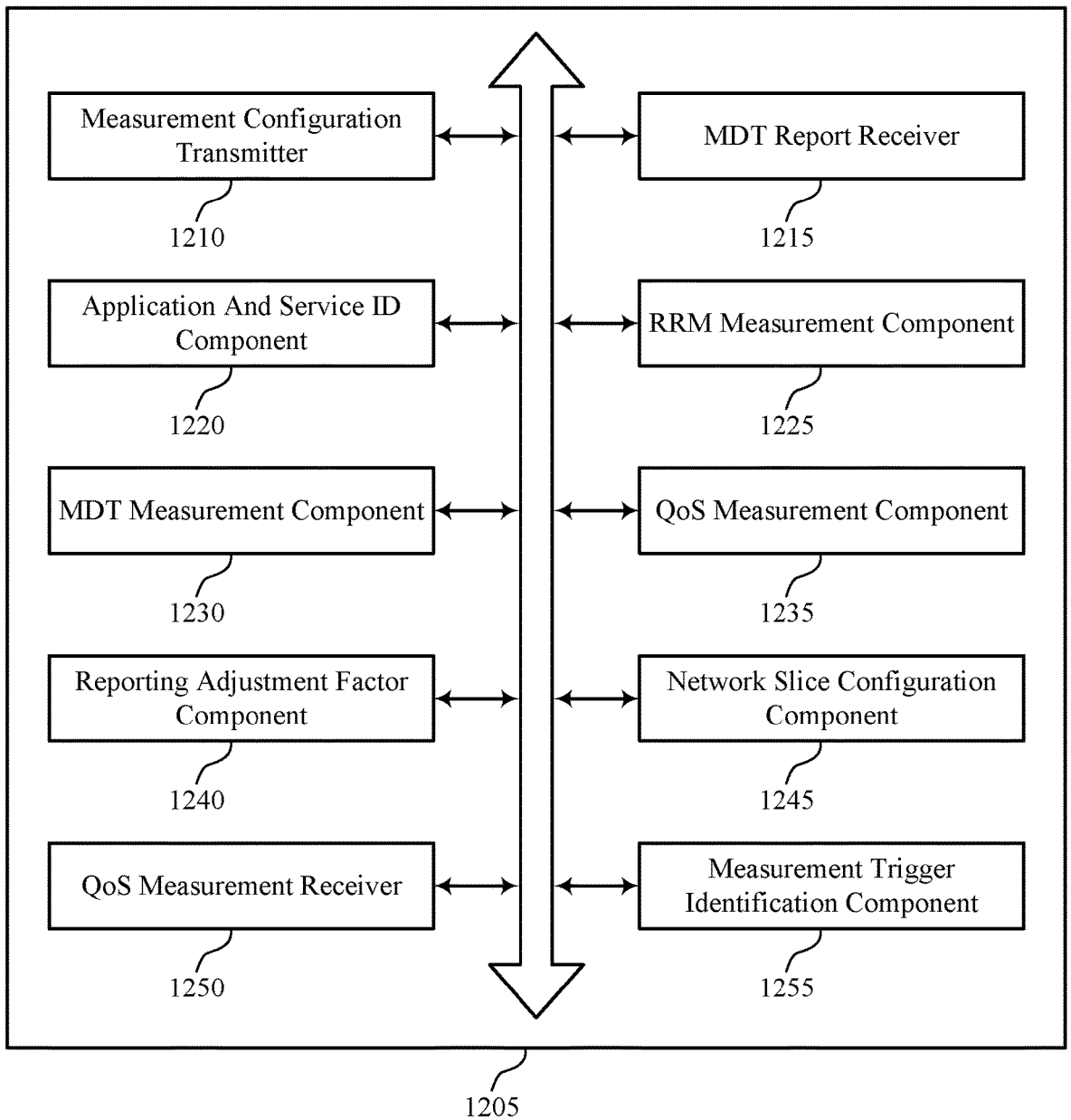
FIG. 12 shows a block diagram of a communications manager that supports application, services, and network slice based measurements for MDT reporting in accordance with aspects of the present disclosure.

FIG. 12 shows a block diagram 1200 of a communications manager 1205 that supports application, services, and network slice based measurements for MDT reporting in accordance with aspects of the present disclosure. The communications manager 1205 may be an example of aspects of a communications manager 1015, a communications manager 1115, or a communications manager 1310 described herein. The communications manager 1205 may include a measurement configuration transmitter 1210, a MDT report receiver 1215, an application and service ID component 1220, a RRM measurement component 1225, a MDT measurement component 1230, a QoS measurement component 1235, a reporting adjustment factor component 1240, a network slice configuration component 1245, a QoS measurement receiver 1250, and a measurement trigger identification component 1255. Each of these modules may communicate, directly or indirectly, with one another (e.g., via one or more buses).

The measurement configuration transmitter 1210 may transmit, to a UE, a measurement configuration received from an OAM interface for performing the MDT measurements to include in a MDT report, the measurement configuration indicating one or more triggering events including the start of an application or service at the UE which, upon occurrence, trigger the MDT measurements at the UE. The measurement trigger identification component 1255 may verify that the triggering event for initiating the one or more QoE measurements at the UE is not associated with the application- or service-specific measurement configuration, where the one or more QoE measurements are received in accordance with the first measurement configuration based on the verifying.

In some examples, the measurement configuration transmitter 1210 may transmit, to a UE, a measurement configuration received from an OAM interface for performing MDT measurements to include in a MDT report, the measurement configuration including one or more reporting adjustment factors which affect at least one of a reporting interval or a reporting amount for reporting the MDT report.

In some examples, the measurement configuration transmitter 1210 may transmit, to a UE, a first measurement configuration received from an OAM interface for performing one or more QoE measurements at the UE, the first measurement configuration being different from an application- or service-specific measurement configuration, where the first measurement configuration indicates a triggering event for initiating the one or more QoE measurements at the UE as the start of the application or service. In some examples, the measurement configuration transmitter 1210 may determine that the first measurement configuration includes a default measurement configuration for performing the one or more QoE measurements at the UE. In some examples, the measurement configuration transmitter 1210 may transmit the first measurement configuration upon establishing an RRC connection with the UE.

In some examples, the measurement configuration transmitter 1210 may transmit a second measurement configuration received from the OAM that includes a UE-specific measurement configuration for QoE measurements that are specific to one or more specified applications or services at the UE.

In some examples, the measurement configuration transmitter 1210 may transmit a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE. The measurement trigger identification component 1255 may verify that the triggering event for initiating the one or more QoE measurements at the UE is not associated with the application- or service-specific measurement configuration, where the one or more QoE measurements are received in accordance with the second measurement configuration based on the verifying.

In some examples, the measurement configuration transmitter 1210 may transmit a third measurement configuration received from the OAM that includes a UE-specific measurement configuration for QoE measurements that are specific to one or more specified applications or services at the UE. In some examples, the measurement configuration transmitter 1210 may determine that the second measurement configuration includes a default measurement configuration for performing the one or more QoE measurements at the UE.

The MDT report receiver 1215 may receive, from the UE, the MDT report that includes the MDT measurements. In some examples, the MDT report receiver 1215 may receive, from the UE, the MDT report in accordance with the one or more reporting adjustment factors. In some examples, the MDT report receiver 1215 may receive a MDT report that includes the one or more application or service IDs based on the one or more application or service IDs being contained in the list of IDs stored at the UE. In some examples, the MDT report receiver 1215 may receive the MDT measurements in accordance with the reporting adjustment factors associated with the time of day.

In some examples, the MDT report receiver 1215 may receive, from the UE, the MDT report that includes the MDT measurements or a measurement report that includes one or more QoE measurements.

The QoS measurement component 1235 may receive one or more QoS measurements included in the MDT report based on the start of the application or service triggering the obtaining of the one or more QoS measurements. In some examples, the QoS measurement component 1235 may measure one or more QoS metrics based on receiving the one or more application or service IDs in the MDT report. In some cases, the one or more QoS measurements include one or more packet delay measurements or packet loss rate measurements. In some cases, the QoS measurements by the serving base station include a data volume measurement, an internet protocol throughout measurement, a packet delay measurement, a packet loss measurement, or any combination thereof.

The QoS measurement receiver 1250 may receive the one or more QoE measurements in a measurement report from the UE. In some examples, the QoS measurement receiver 1250 may receive the QoE measurements from the UE in accordance with the second measurement configuration based on a start of one more specified applications or services at the UE. In some examples, the QoS measurement receiver 1250 may receive the QoE measurements from the UE in accordance with the third measurement configuration based on a start of one more specified applications or services at the UE. In some cases, the one or more QoE measurements include an application layer throughput measurement, a RTT, a jitter metric, a packet drop rate, or any combination thereof.

The application and service ID component 1220 may identify one or more application or service IDs associated with the application or service, where the one or more application or service IDs is contained in a list of IDs stored at the UE and is associated with the one or more triggering events at the UE. In some examples, the application and service ID component 1220 may identify one or more application or service IDs associated with the application or service, where the one or more application or service IDs is contained in a list of IDs stored at the UE and is associated with the one or more triggering events at the UE.

The RRM measurement component 1225 may receive RRM measurements in the MDT report based on determining that the one or more application or service IDs is contained in the list of IDs stored at the UE. In some cases, the RRM measurements include at least one of a RSRP measurement or a RSRQ measurement. In some cases, the RRM measurements include periodic measurements, event-triggered measurements, or a combination thereof.

The MDT measurement component 1230 may receive one or more localization measurements in the MDT report based on the start of the application or service triggering the obtaining of the one or more localization measurements at the UE. In some examples, the MDT measurement component 1230 may receive localization measurements as one or more RSSI measurements or RTT measurements, where the localization measurements are associated with common location information, wireless local area network location information, Bluetooth location information, sensor information, or any combination thereof.

The reporting adjustment factor component 1240 may allocate one or more reporting adjustment factors for obtaining the MDT measurements by the UE to a first area configuration common to the UE and the serving base station, where the MDT measurements are based on the reporting adjustment factors specific to the first area configuration. In some examples, the reporting adjustment factor component 1240 may allocate a second set of reporting adjustment factors specific to a second area configuration, where the second set of reporting adjustment factors are different from the one or more reporting adjustment factors specific to the first area configuration.

In some examples, the reporting adjustment factor component 1240 may determine that the one or more reporting adjustment factors for obtaining the MDT measurements are to be associated with a time of day in which the serving base station transmits the measurement configuration. In some cases, the one or more reporting adjustment factors at a first time of day are different from the one or more reporting adjustment factors at a second time of day.

The network slice configuration component 1245 may identify a first network slice of one or more network slices supporting communications between the UE and the serving base station. In some examples, the network slice configuration component 1245 may determine that the first network slice is contained in a list of network slices, where the list of network slices indicates network slices for which the serving base station identifies for the UE to obtain the MDT measurements, where the MDT measurements associated with the first network slice are based on the first network slice being contained in the list of network slices.

In some examples, the network slice configuration component 1245 may allocate one or more reporting adjustment factors associated with the first network slice and a second network slice, where the reporting adjustment factors associated with the first network slice are different from the reporting adjustment factors associated with the second network slice.

Figure 13:
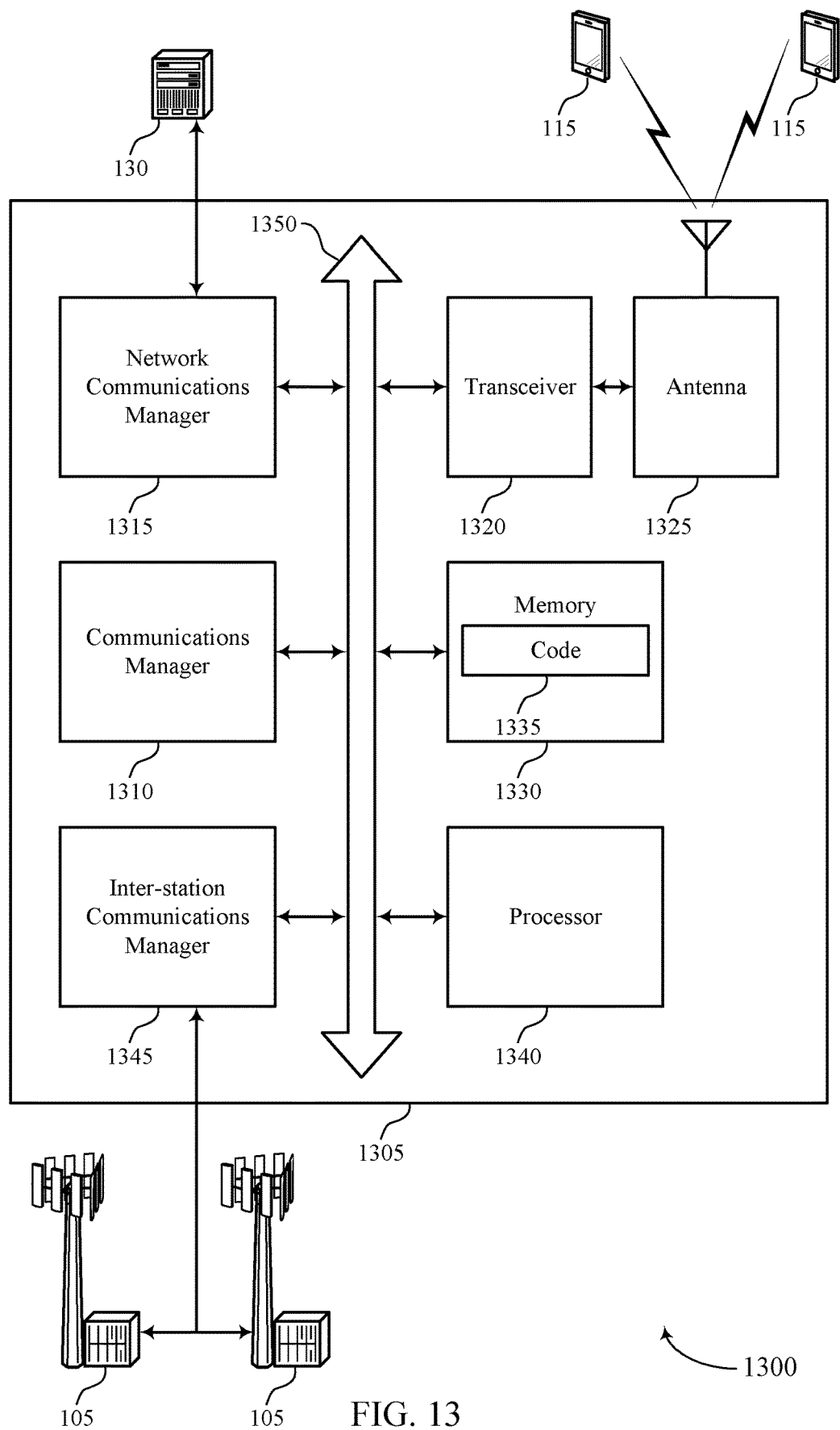
FIG. 13 shows a diagram of a system including a device that supports application, services, and network slice based measurements for MDT reporting in accordance with aspects of the present disclosure.

FIG. 13 shows a diagram of a system 1300 including a device 1305 that supports application, services, and network slice based measurements for MDT reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be coupled via one or more buses (e.g., bus 1350).

The communications manager 1310 may transmit, to a UE, a measurement configuration received from an OAM interface for performing the MDT measurements to include in a MDT report, the measurement configuration indicating one or more triggering events including the start of an application or service at the UE which, upon occurrence, trigger the MDT measurements at the UE and receive, from the UE, the MDT report that includes the MDT measurements. The communications manager 1310 may also transmit, to a UE a measurement configuration received from an OAM interface for performing MDT measurements to include in a MDT report, the measurement configuration including one or more reporting adjustment factors which affect at least one of a reporting interval or a reporting amount for reporting the MDT report and receive, from the UE, the MDT report in accordance with the one or more reporting adjustment factors. The communications manager 1310 may also transmit, to a UE, a first measurement configuration received from an OAM interface for performing one or more QoE measurements at the UE, the first measurement configuration being different from an application- or service-specific measurement configuration, where the first measurement configuration indicates a triggering event for initiating the one or more QoE measurements at the UE as the start of the application or service and receive the one or more QoE measurements in a measurement report from the UE.

The communications manager 1310 may also transmit, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, where the first measurement configuration or the second measurement configuration indicates one or more triggering events including the start of an application or service at the UE which, upon occurrence, trigger the MDT measurements, the QoE measurements, generation of a message indicating the one or more triggering events, or any combination thereof, at the UE, and receive, from the UE, the MDT report that includes the MDT measurements or a measurement report that includes one or more QoE measurements.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting application, services, and network slice based measurements for MDT reporting).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
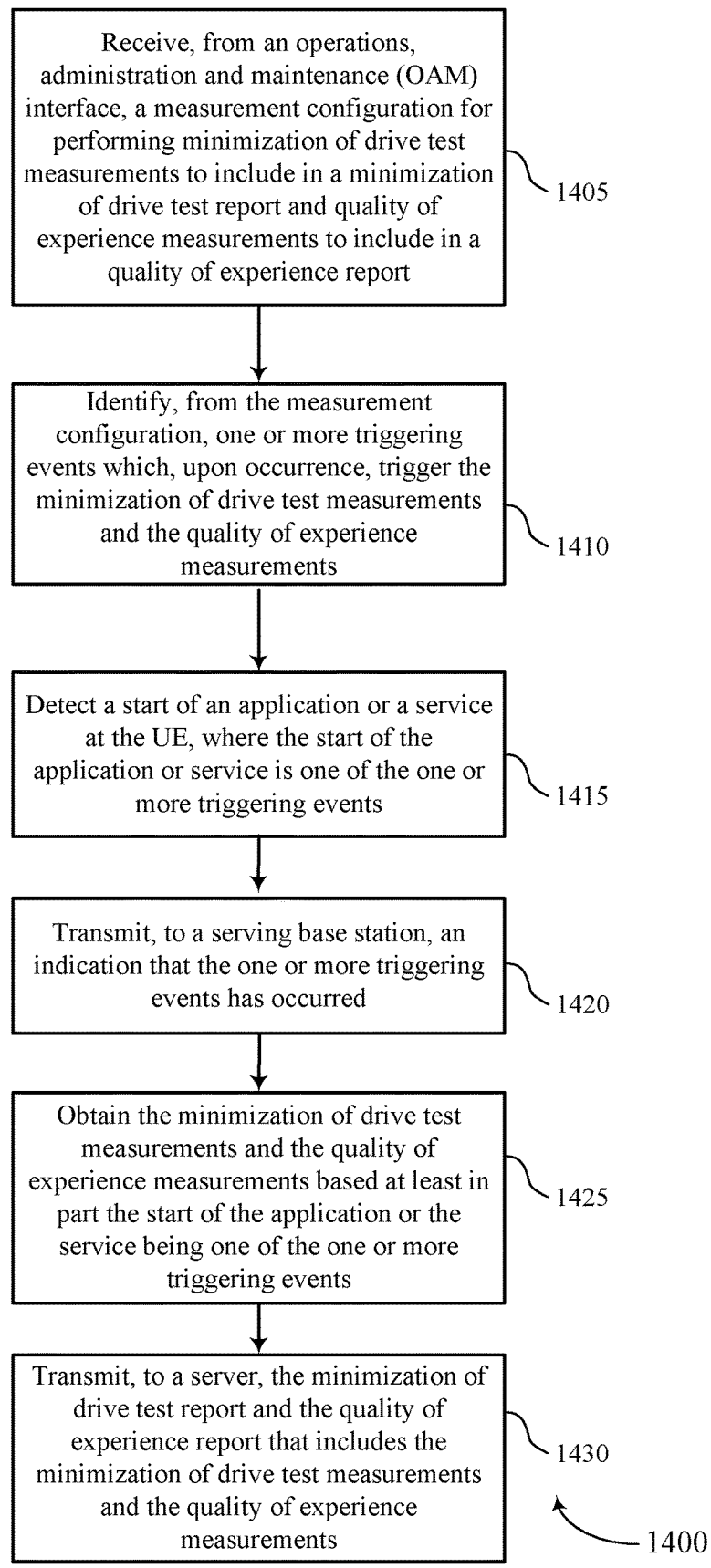
FIGS. 14 through 22 show flowcharts illustrating methods that support application, services, and network slice based measurements for MDT reporting in accordance with aspects of the present disclosure.

FIG. 14 shows a flowchart illustrating a method 1400 that supports application, services, and network slice based measurements for MDT reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from an OAM interface, a measurement configuration for performing MDT measurements to include in a MDT report and QoE measurements to include in a QoE report. The operations of 1405 may be performed according to the methods described herein. In some examples, aspects of the operations of 1405 may be performed by a measurement configuration receiver as described with reference to FIGS. 6 through 9.

At 1410, the UE may identify, from the measurement configuration, one or more triggering events which, upon occurrence, trigger the MDT measurements and the QoE measurements. The operations of 1410 may be performed according to the methods described herein. In some examples, aspects of the operations of 1410 may be performed by a measurement trigger identification component as described with reference to FIGS. 6 through 9.

At 1415, the UE may detect a start of an application or a service at the UE, where the start of the application or service is one of the one or more triggering events. The operations of 1415 may be performed according to the methods described herein. In some examples, aspects of the operations of 1415 may be performed by an application and service identification component as described with reference to FIGS. 6 through 9.

At 1420, the UE may transmit, to a serving base station, an indication that the one or more triggering events has occurred. The operations of 1420 may be performed according to the methods described herein. In some examples, aspects of the operations of 1420 may be performed by an application and service identification component as described with reference to FIGS. 6 through 9.

At 1425, the UE may obtain the MDT measurements and the QoE measurements based at least in part on the start of the application or the service being one of the one or more triggering events. The operations of 1425 may be performed according to the methods described herein. In some examples, aspects of the operations of 1425 may be performed by a MDT measurement component as described with reference to FIGS. 6 through 9.

At 1430, the UE may transmit, to a server, the MDT report and the QoE report that includes the MDT measurements and the QoE measurements. The operations of 1430 may be performed according to the methods described herein. In some examples, aspects of the operations of 1430 may be performed by a MDT report transmitter as described with reference to FIGS. 6 through 9.

Figure 15:
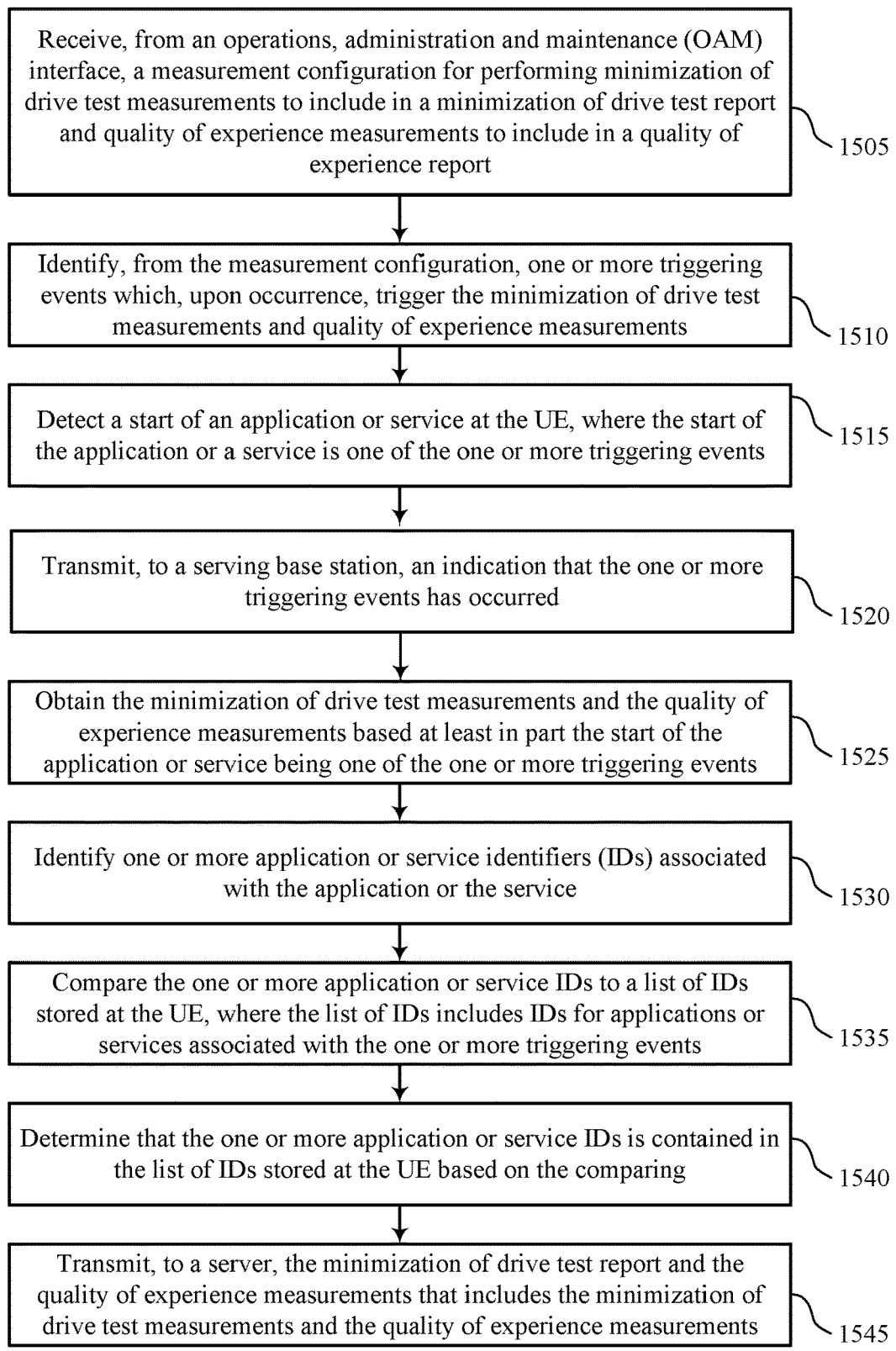

FIG. 15 shows a flowchart illustrating a method 1500 that supports application, services, and network slice based measurements for MDT reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from an OAM interface, a measurement configuration for performing MDT measurements to include in a MDT report and QoE measurements to include in a QoE report. The operations of 1505 may be performed according to the methods described herein. In some examples, aspects of the operations of 1505 may be performed by a measurement configuration receiver as described with reference to FIGS. 6 through 9.

At 1510, the UE may identify, from the measurement configuration, one or more triggering events which, upon occurrence, trigger the MDT measurements and the QoE measurements. The operations of 1510 may be performed according to the methods described herein. In some examples, aspects of the operations of 1510 may be performed by a measurement trigger identification component as described with reference to FIGS. 6 through 9.

At 1515, the UE may detect a start of an application or a service at the UE, where the start of the application or service is one of the one or more triggering events. The operations of 1515 may be performed according to the methods described herein. In some examples, aspects of the operations of 1515 may be performed by an application and service identification component as described with reference to FIGS. 6 through 9.

At 1520, the UE may transmit, to a serving base station, an indication that the one or more triggering events has occurred. The operations of 1520 may be performed according to the methods described herein. In some examples, aspects of the operations of 1520 may be performed by an application and service identification component as described with reference to FIGS. 6 through 9.

At 1525, the UE may obtain the MDT measurements and the QoE measurements based at least in part on the start of the application or service being one of the one or more triggering events. The operations of 1525 may be performed according to the methods described herein. In some examples, aspects of the operations of 1525 may be performed by a MDT measurement component as described with reference to FIGS. 6 through 9.

At 1530, the UE may identify one or more application or service IDs associated with the application or the service. The operations of 1530 may be performed according to the methods described herein. In some examples, aspects of the operations of 1530 may be performed by an application and service ID component as described with reference to FIGS. 6 through 9.

At 1535, the UE may compare the one or more application or service IDs to a list of IDs stored at the UE, where the list of IDs includes IDs for applications or services associated with the one or more triggering events. The operations of 1535 may be performed according to the methods described herein. In some examples, aspects of the operations of 1535 may be performed by an application and service ID component as described with reference to FIGS. 6 through 9.

At 1540, the UE may determine that the one or more application or service IDs is contained in the list of IDs stored at the UE based on the comparing. The operations of 1540 may be performed according to the methods described herein. In some examples, aspects of the operations of 1540 may be performed by an application and service ID component as described with reference to FIGS. 6 through 9.

At 1545, the UE may transmit, to a server, the MDT report and the QoE report that includes the MDT measurements and the QoE measurements. The operations of 1545 may be performed according to the methods described herein. In some examples, aspects of the operations of 1545 may be performed by a MDT report transmitter as described with reference to FIGS. 6 through 9.

Figure 16:
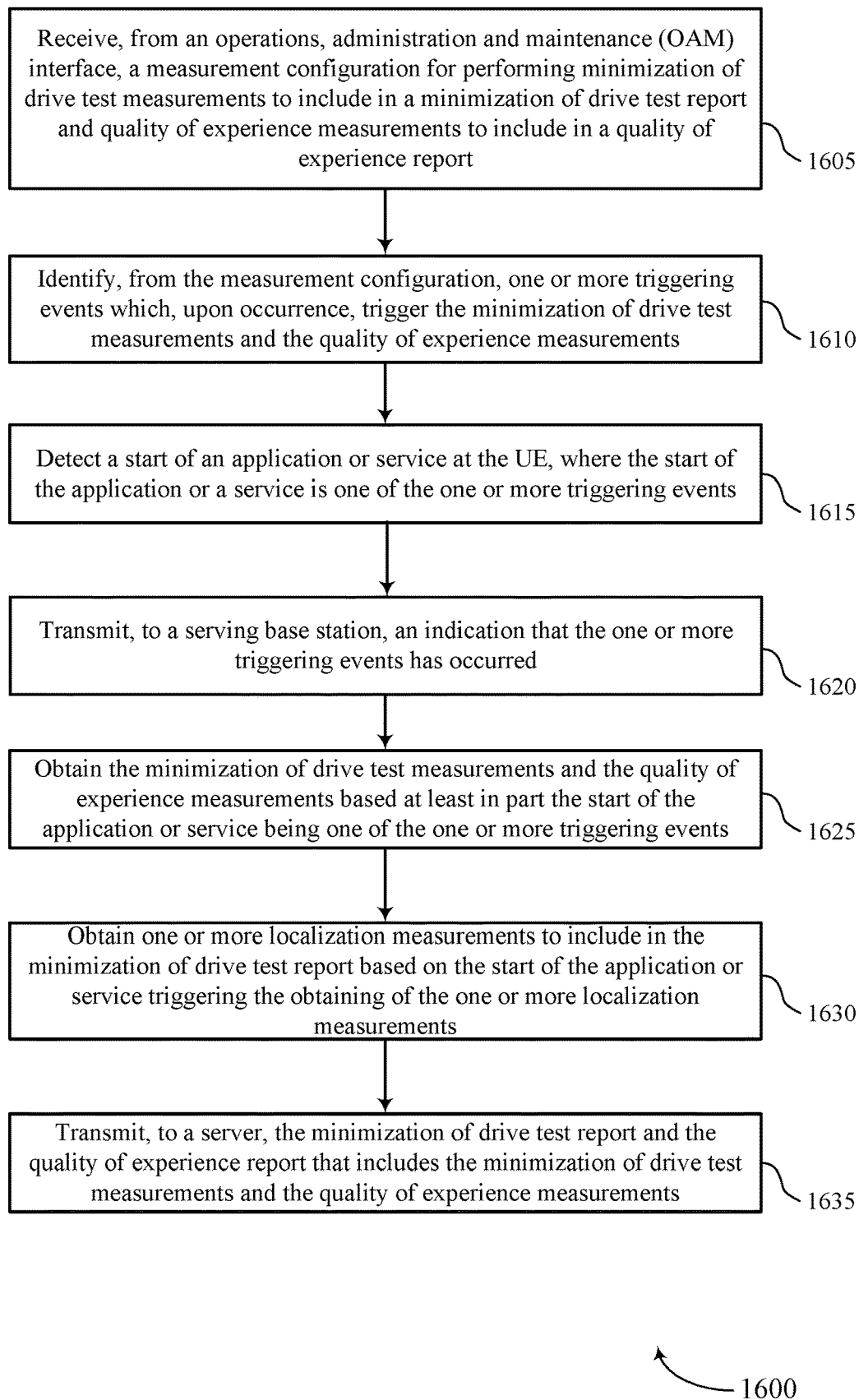

FIG. 16 shows a flowchart illustrating a method 1600 that supports application, services, and network slice based measurements for MDT reporting in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive, from an OAM interface, a measurement configuration for performing MDT measurements to include in a MDT report and QoE measurements to include in a QoE report. The operations of 1605 may be performed according to the methods described herein. In some examples, aspects of the operations of 1605 may be performed by a measurement configuration receiver as described with reference to FIGS. 6 through 9.

At 1610, the UE may identify, from the measurement configuration, one or more triggering events which, upon occurrence, trigger the MDT measurements and QoE measurements. The operations of 1610 may be performed according to the methods described herein. In some examples, aspects of the operations of 1610 may be performed by a measurement trigger identification component as described with reference to FIGS. 6 through 9.

At 1615, the UE may detect a start of an application or a service at the UE, where the start of the application or service is one of the one or more triggering events. The operations of 1615 may be performed according to the methods described herein. In some examples, aspects of the operations of 1615 may be performed by an application and service identification component as described with reference to FIGS. 6 through 9.

At 1620, the UE may transmit, to a serving base station, an indication that the one or more triggering events has occurred. The operations of 1620 may be performed according to the methods described herein. In some examples, aspects of the operations of 1620 may be performed by an application and service identification component as described with reference to FIGS. 6 through 9.

At 1625, the UE may obtain the MDT measurements and the QoE measurements based at least in part on the start of the application or the service being one of the one or more triggering events. The operations of 1625 may be performed according to the methods described herein. In some examples, aspects of the operations of 1625 may be performed by a MDT measurement component as described with reference to FIGS. 6 through 9.

At 1630, the UE may obtain one or more localization measurements to include in the MDT report based on the start of the application or service triggering the obtaining of the one or more localization measurements. The operations of 1630 may be performed according to the methods described herein. In some examples, aspects of the operations of 1630 may be performed by a MDT measurement component as described with reference to FIGS. 6 through 9.

At 1635, the UE may transmit, to a server, the MDT report and the QoE report that includes the MDT measurements and the QoE measurements. The operations of 1635 may be performed according to the methods described herein. In some examples, aspects of the operations of 1635 may be performed by a MDT report transmitter as described with reference to FIGS. 6 through 9.

Figure 17:
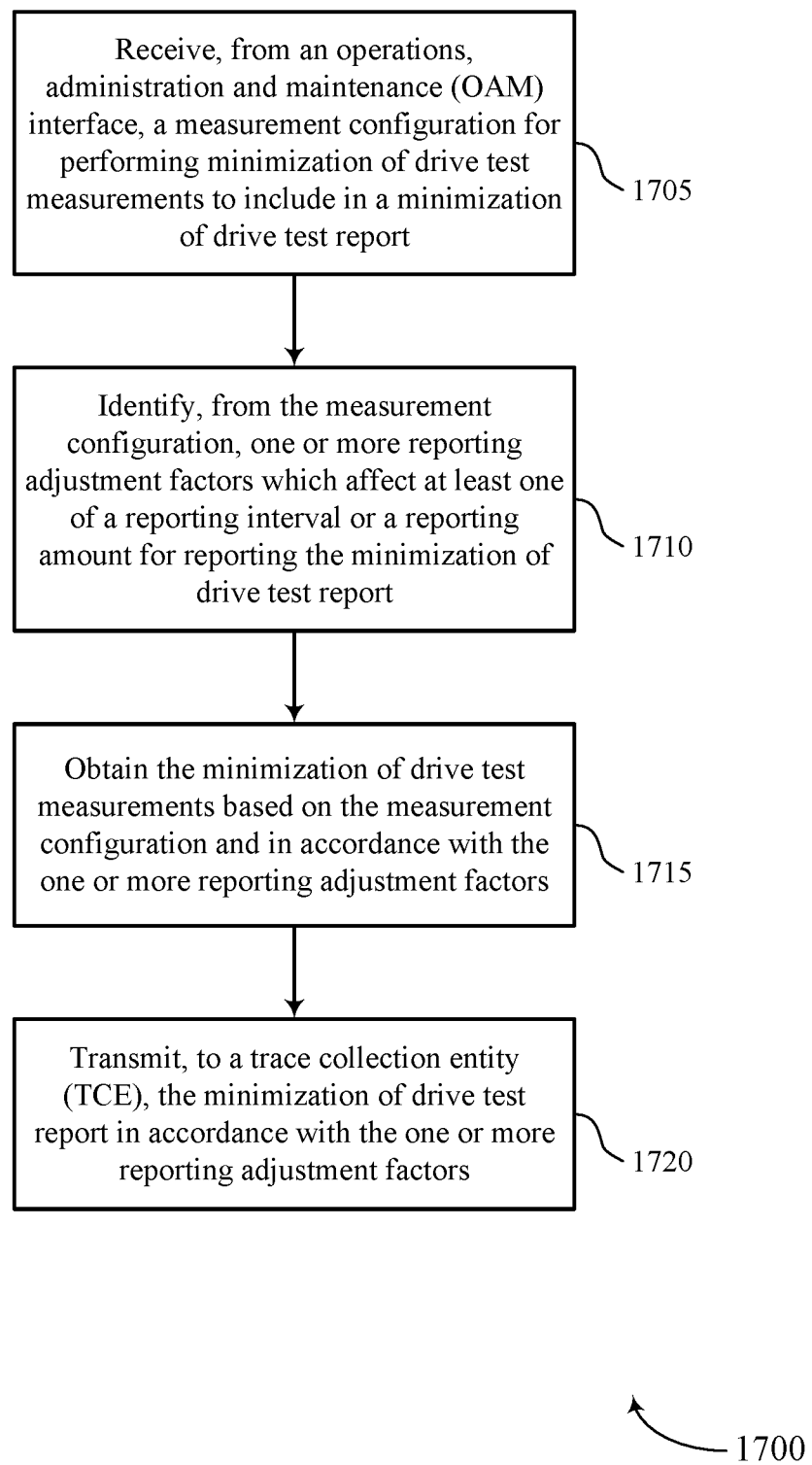

FIG. 17 shows a flowchart illustrating a method 1700 that supports application, services, and network slice based measurements for MDT reporting in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive, from an OAM interface, a measurement configuration for performing MDT measurements to include in a MDT report. The operations of 1705 may be performed according to the methods described herein. In some examples, aspects of the operations of 1705 may be performed by a measurement configuration receiver as described with reference to FIGS. 6 through 9.

At 1710, the UE may identify, from the measurement configuration, one or more reporting adjustment factors which affect at least one of a reporting interval or a reporting amount for reporting the MDT report. The operations of 1710 may be performed according to the methods described herein. In some examples, aspects of the operations of 1710 may be performed by a reporting adjustment factor component as described with reference to FIGS. 6 through 9.

At 1715, the UE may obtain the MDT measurements based on the measurement configuration and in accordance with the one or more reporting adjustment factors. The operations of 1715 may be performed according to the methods described herein. In some examples, aspects of the operations of 1715 may be performed by a MDT measurement component as described with reference to FIGS. 6 through 9.

At 1720, the UE may transmit, to a TCE, the MDT report in accordance with the one or more reporting adjustment factors. The operations of 1720 may be performed according to the methods described herein. In some examples, aspects of the operations of 1720 may be performed by a MDT report transmitter as described with reference to FIGS. 6 through 9.

Figure 18:
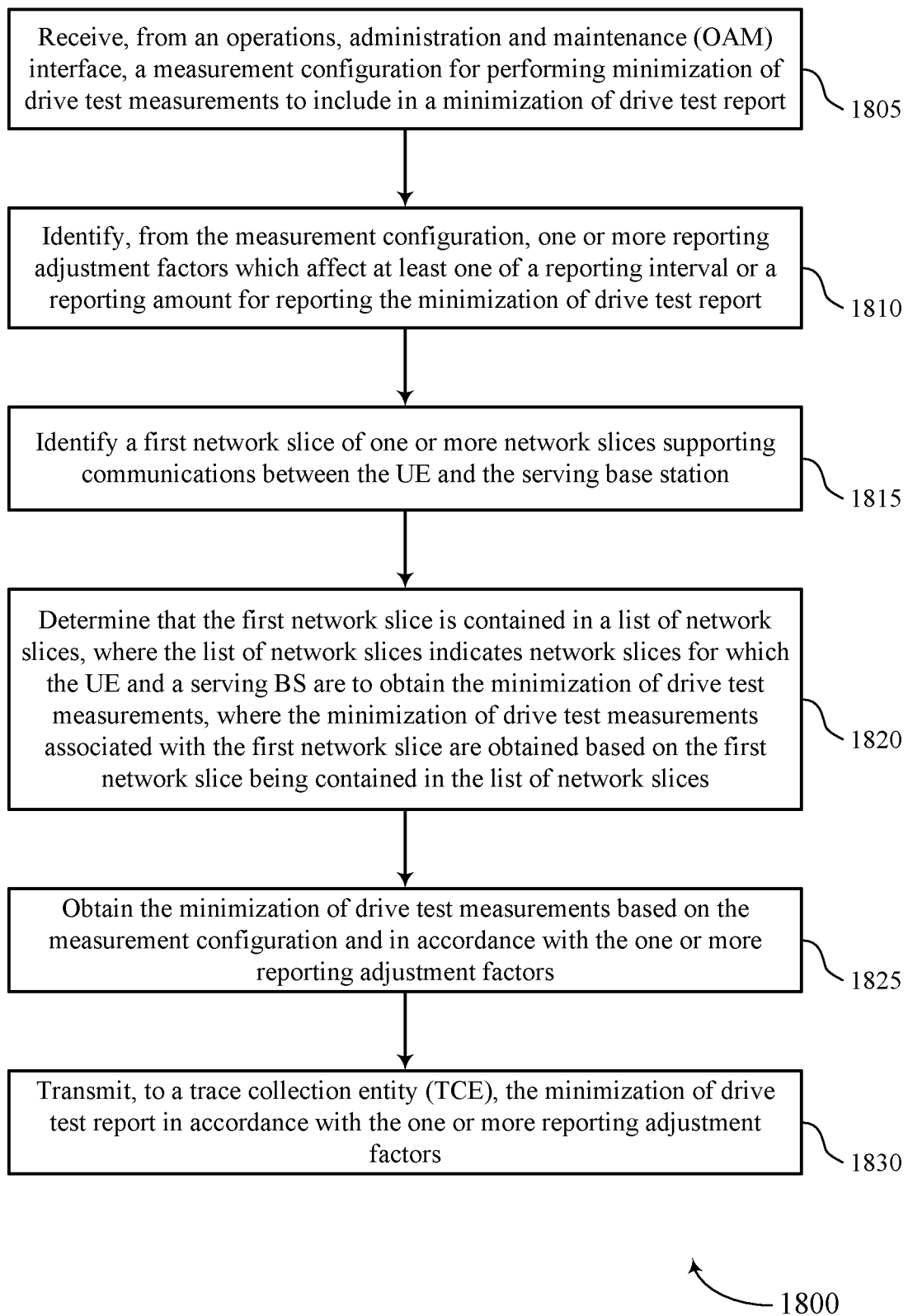

FIG. 18 shows a flowchart illustrating a method 1800 that supports application, services, and network slice based measurements for MDT reporting in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive, from an OAM interface, a measurement configuration for performing MDT measurements to include in a MDT report. The operations of 1805 may be performed according to the methods described herein. In some examples, aspects of the operations of 1805 may be performed by a measurement configuration receiver as described with reference to FIGS. 6 through 9.

At 1810, the UE may identify, from the measurement configuration, one or more reporting adjustment factors which affect at least one of a reporting interval or a reporting amount for reporting the MDT report. The operations of 1810 may be performed according to the methods described herein. In some examples, aspects of the operations of 1810 may be performed by a reporting adjustment factor component as described with reference to FIGS. 6 through 9.

At 1815, the UE may identify a first network slice of one or more network slices supporting communications between the UE and the serving base station. The operations of 1815 may be performed according to the methods described herein. In some examples, aspects of the operations of 1815 may be performed by a network slice configuration component as described with reference to FIGS. 6 through 9.

At 1820, the UE may determine that the first network slice is contained in a list of network slices, where the list of network slices indicates network slices for which the UE and a serving BS are to obtain the MDT measurements, where the MDT measurements associated with the first network slice are obtained based on the first network slice being contained in the list of network slices. The operations of 1820 may be performed according to the methods described herein. In some examples, aspects of the operations of 1820 may be performed by a network slice configuration component as described with reference to FIGS. 6 through 9.

At 1825, the UE may obtain the MDT measurements based on the measurement configuration and in accordance with the one or more reporting adjustment factors. The operations of 1825 may be performed according to the methods described herein. In some examples, aspects of the operations of 1825 may be performed by a MDT measurement component as described with reference to FIGS. 6 through 9.

At 1830, the UE may transmit, to a TCE, the MDT report in accordance with the one or more reporting adjustment factors. The operations of 1830 may be performed according to the methods described herein. In some examples, aspects of the operations of 1830 may be performed by a MDT report transmitter as described with reference to FIGS. 6 through 9.

Figure 19:
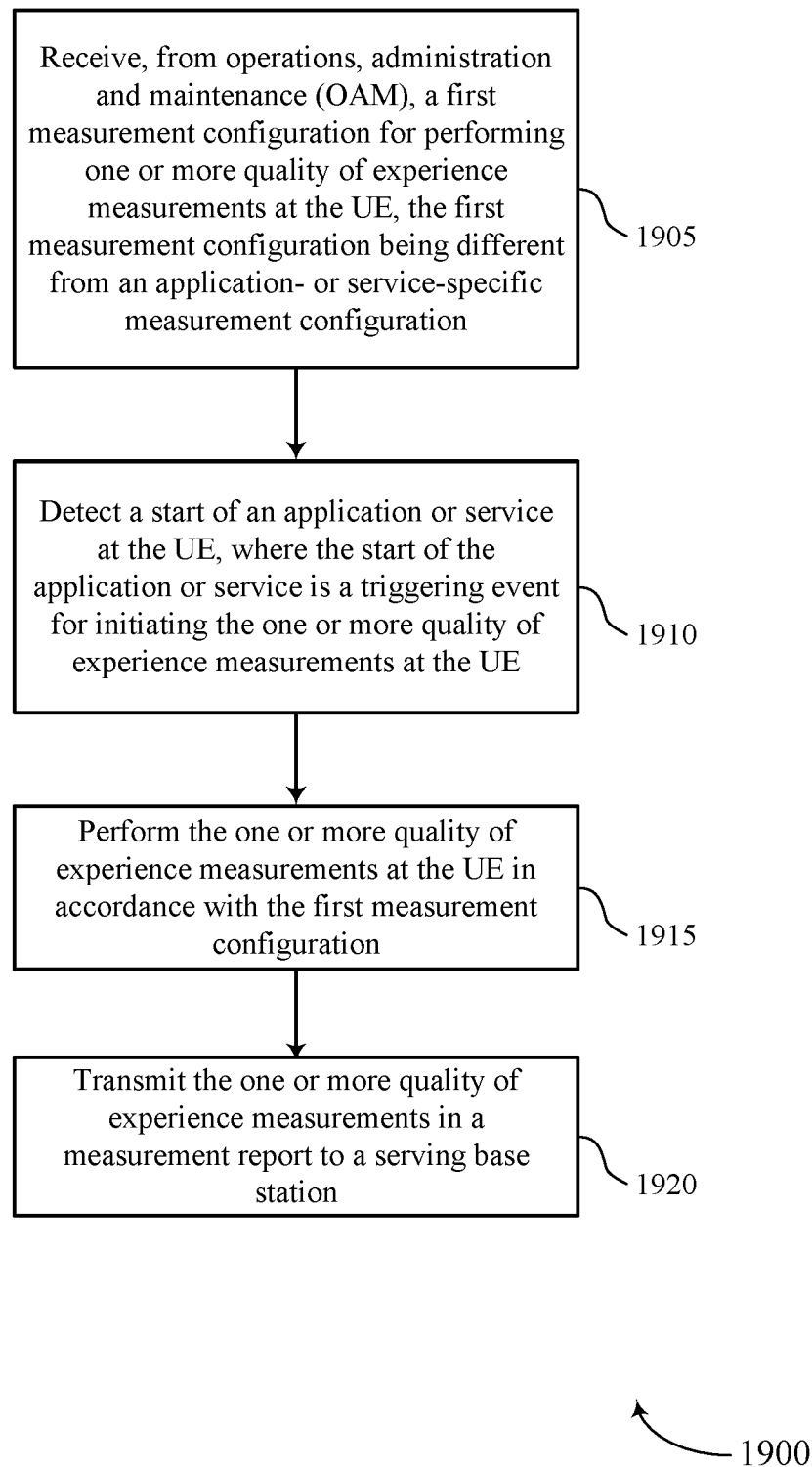

FIG. 19 shows a flowchart illustrating a method 1900 that supports application, services, and network slice based measurements for MDT reporting in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may receive, from an OAM interface, a first measurement configuration for performing one or more QoE measurements at the UE, the first measurement configuration being different from an application- or service-specific measurement configuration. The operations of 1905 may be performed according to the methods described herein. In some examples, aspects of the operations of 1905 may be performed by a measurement configuration receiver as described with reference to FIGS. 6 through 9.

At 1910, the UE may detect a start of an application or service at the UE, where the start of the application or service is a triggering event for initiating the one or more QoE measurements at the UE. The operations of 1910 may be performed according to the methods described herein. In some examples, aspects of the operations of 1910 may be performed by a measurement trigger identification component as described with reference to FIGS. 6 through 9.

At 1915, the UE may perform the one or more QoE measurements at the UE in accordance with the first measurement configuration. The operations of 1915 may be performed according to the methods described herein. In some examples, aspects of the operations of 1915 may be performed by a QoS measurement component as described with reference to FIGS. 6 through 9.

At 1920, the UE may transmit the one or more QoE measurements in a measurement report to a serving base station. The operations of 1920 may be performed according to the methods described herein. In some examples, aspects of the operations of 1920 may be performed by a QoS measurement component as described with reference to FIGS. 6 through 9.

Figure 20:
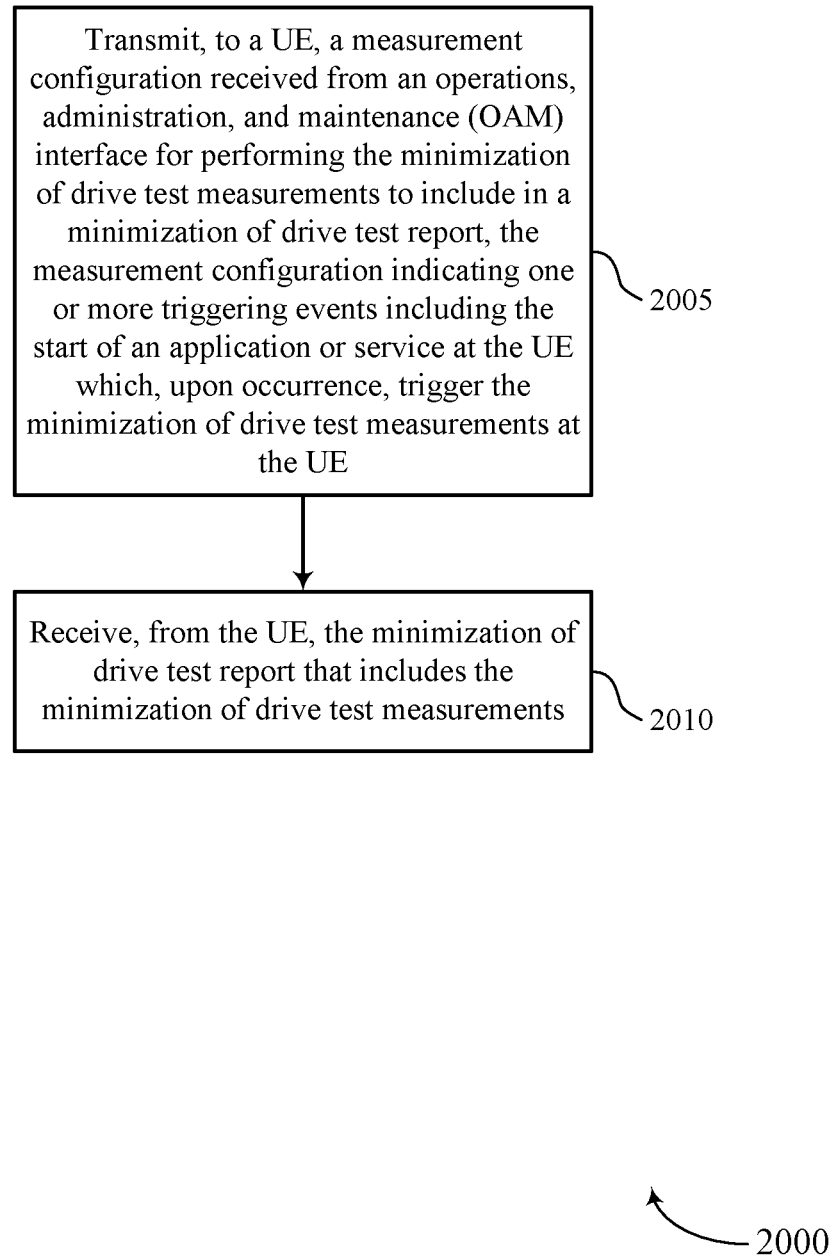

FIG. 20 shows a flowchart illustrating a method 2000 that supports application, services, and network slice based measurements for MDT reporting in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may transmit, to a UE, a measurement configuration received from an OAM interface for performing the MDT measurements to include in a MDT report, the measurement configuration indicating one or more triggering events including the start of an application or service at the UE which, upon occurrence, trigger the MDT measurements at the UE. The operations of 2005 may be performed according to the methods described herein. In some examples, aspects of the operations of 2005 may be performed by a measurement configuration transmitter as described with reference to FIGS. 10 through 13.

At 2010, the base station may receive, from the UE, the MDT report that includes the MDT measurements. The operations of 2010 may be performed according to the methods described herein. In some examples, aspects of the operations of 2010 may be performed by a MDT report receiver as described with reference to FIGS. 10 through 13.

Figure 21:
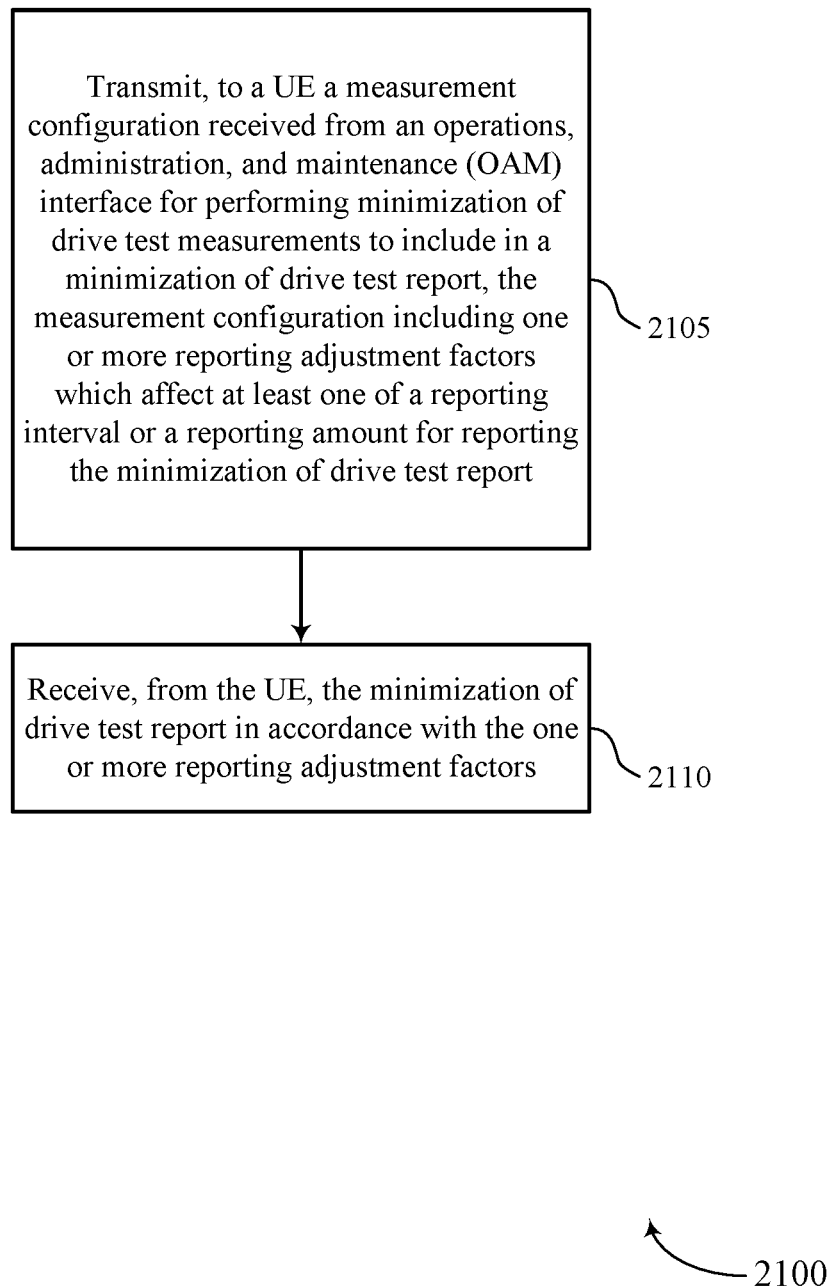

FIG. 21 shows a flowchart illustrating a method 2100 that supports application, services, and network slice based measurements for MDT reporting in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2105, the base station may transmit, to a UE a measurement configuration received from an OAM interface for performing MDT measurements to include in a MDT report, the measurement configuration including one or more reporting adjustment factors which affect at least one of a reporting interval or a reporting amount for reporting the MDT report. The operations of 2105 may be performed according to the methods described herein. In some examples, aspects of the operations of 2105 may be performed by a measurement configuration transmitter as described with reference to FIGS. 10 through 13.

At 2110, the base station may receive, from the UE, the MDT report in accordance with the one or more reporting adjustment factors. The operations of 2110 may be performed according to the methods described herein. In some examples, aspects of the operations of 2110 may be performed by a MDT report receiver as described with reference to FIGS. 10 through 13.

Figure 22:
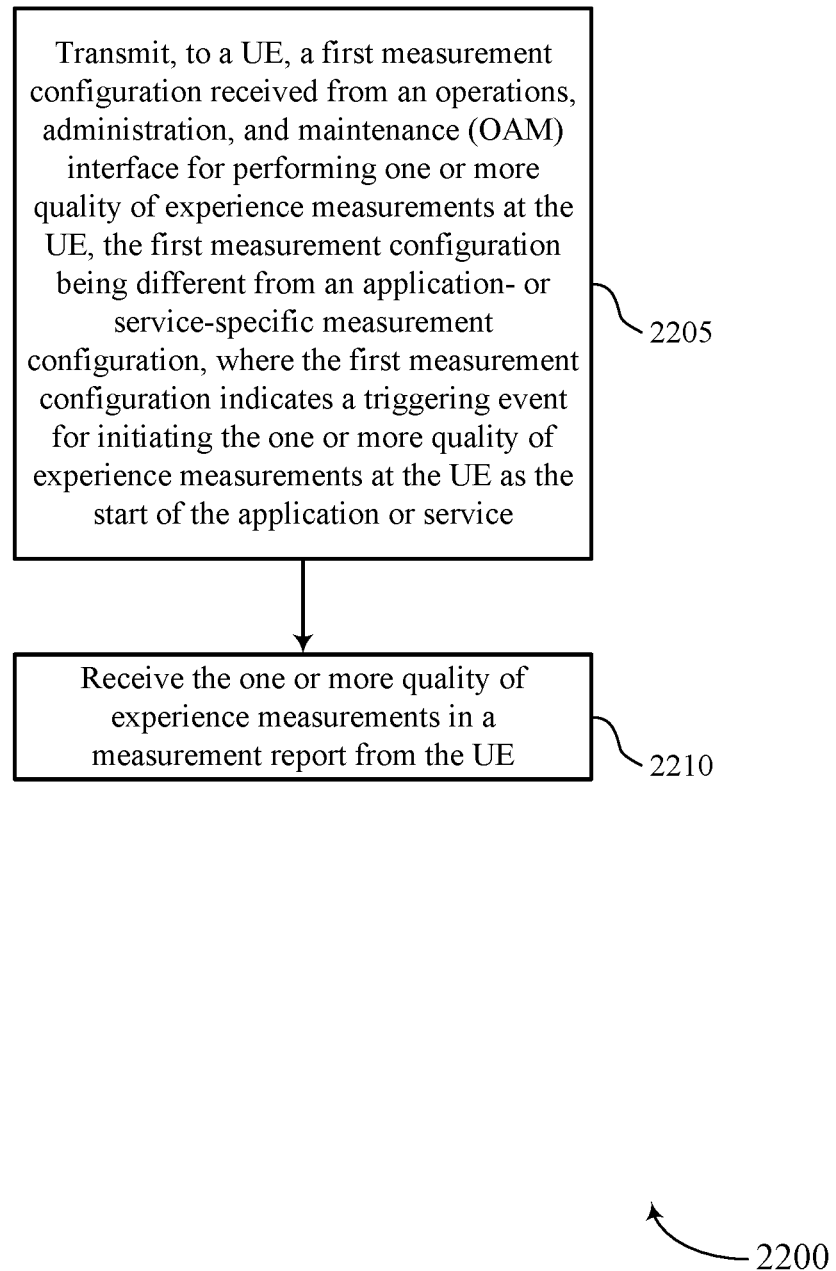

FIG. 22 shows a flowchart illustrating a method 2200 that supports application, services, and network slice based measurements for MDT reporting in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2205, the base station may transmit, to a UE, a first measurement configuration received from an OAM interface for performing one or more QoE measurements at the UE, the first measurement configuration being different from an application- or service-specific measurement configuration, where the first measurement configuration indicates a triggering event for initiating the one or more QoE measurements at the UE as the start of the application or service. The operations of 2205 may be performed according to the methods described herein. In some examples, aspects of the operations of 2205 may be performed by a measurement configuration transmitter as described with reference to FIGS. 10 through 13.

At 2210, the base station may receive the one or more QoE measurements in a measurement report from the UE. The operations of 2210 may be performed according to the methods described herein. In some examples, aspects of the operations of 2210 may be performed by a QoS measurement receiver as described with reference to FIGS. 10 through 13.

The following provides an overview of aspects of the present disclosure:

Aspect 1: A method for wireless communications at a UE comprising: receiving, from an OAM interface, measurement configuration for performing MDT measurements to include in a MDT report; identifying, from the measurement configuration, one or more triggering events which, upon occurrence, trigger the MDT measurements; detecting a start of an application or service at the UE, wherein the start of the application or service is one of the one or more triggering events; obtaining the MDT measurements based at least in part the start of the application or service being one of the one or more triggering events; and transmitting, to a TCE the MDT report that includes the MDT measurements.

Aspect 2: The method of aspect 1, further comprising: identifying one or more application or service IDs associated with the application or service; comparing the one or more application or service IDs to a list of IDs stored at the UE, wherein the list of IDs comprises IDs for applications or services associated with the one or more triggering events; and determining that the one or more application or service IDs is contained in the list of IDs stored at the UE based at least in part on the comparing.

Aspect 3: The method of aspect 2, further comprising: generating MDT report to include the one or more application or service IDs based at least in part on determining that the one or more application or service IDs is contained in the list of IDs stored at the UE.

Aspect 4: The method of any of aspects 2 or 3, wherein obtaining the MDT measurements further comprises: obtaining RRM measurements to include in the MDT report based at least in part on determining that the one or more application or service IDs is contained in the list of IDs stored at the UE.

Aspect 5: The method of any of aspects 2 to 4, wherein the RRM measurements comprise at least one of an RSRP measurement or an RSRQ measurement.

Aspect 6: The method of any of aspects 2 to 5, wherein the RRM measurements comprise periodic measurements, event-triggered measurements, or a combination thereof.

Aspect 7: The method of any of aspects 1 to 6, wherein obtaining the MDT measurements further comprises: obtaining one or more localization measurements to include in the MDT report based at least in part on the start of the application or service triggering the obtaining of the one or more localization measurements.

Aspect 8: The method of aspect 7, wherein obtaining one or more localization measurements further comprises: obtaining localization measurements as one or more RSSI measurements or RTT measurements, wherein the localization measurements are associated with common location information, wireless local area network location information, Bluetooth location information, sensor information, or any combination thereof Aspect 9: The method of any of aspects 1 to 8, wherein obtaining the MDT measurements further comprises: obtaining one or more QoS measurements to include in the MDT report based at least in part on the start of the application or service triggering the obtaining of the one or more QoS measurements.

Aspect 10: The method of aspect 9, wherein the one or more QoS measurements comprise one or more packet delay measurements or packet loss rate measurements.

Aspect 11: The method of any of aspects 1 to 10, further comprising: receiving, in the measurement configuration, an indication that the UE is to include one or more application or service IDs in the MDT report, wherein the one or more application or service IDs prompt QoS measurements by a serving base station.

Aspect 12: The method of aspect 11, wherein the QoS measurements by the serving base station comprise a data volume measurement, an internet protocol throughout measurement, a packet delay measurement, a packet loss measurement, or any combination thereof.

Aspect 13: A method for wireless communications at a UE comprising: receiving, from an OAM interface, a measurement configuration for performing MDT measurements to include in a MDT report; identifying, from the measurement configuration, one or more reporting adjustment factors which affect at least one of a reporting interval or a reporting amount for reporting the MDT report; obtaining the MDT measurements based at least in part on the measurement configuration and in accordance with the one or more reporting adjustment factors; and transmitting, to a TCE, the MDT report in accordance with the one or more reporting adjustment factors.

Aspect 14: The method of aspect 13, further comprising: determining that the one or more reporting adjustment factors for obtaining the MDT measurements are specific to a first area configuration common to the UE and a serving base station, wherein the MDT measurements are obtained in accordance with the reporting adjustment factors specific to the first area configuration.

Aspect 15: The method of aspect 14, further comprising: identifying a second set of reporting adjustment factors specific to a second area configuration, wherein the second set of reporting adjustment factors are different from the one or more reporting adjustment factors specific to the first area configuration Aspect 16: The method of any of aspects 13 to 15, further comprising: determining that the one or more reporting adjustment factors for obtaining the MDT measurements are associated with a time of day in which the UE receives the measurement configuration; and obtaining the MDT measurements in accordance with the reporting adjustment factors associated with the time of day.

Aspect 17: The method of any of aspects 13 to 16, wherein the one or more reporting adjustment factors at a first time of day are different from the one or more reporting adjustment factors at a second time of day.

Aspect 18: The method of any of aspects 13 to 17, further comprising: identifying a first network slice of one or more network slices supporting communications between the UE and the serving base station; and determining that the first network slice is contained in a list of network slices, wherein the list of network slices indicates network slices for which the UE and a serving BS are to obtain the MDT and QoE measurements, wherein the MDT measurements associated with the first network slice are obtained based at least in part on the first network slice being contained in the list of network slices.

Aspect 19: The method of aspect 18, wherein obtaining the MDT measurements further comprises: identifying one or more reporting adjustment factors associated with the first network slice and a second network slice, wherein the reporting adjustment factors associated with the first network slice are different from the reporting adjustment factors associated with the second network slice.

Aspect 20: A method for wireless communications at a UE comprising: receiving, from an OAM interface, a first measurement configuration for performing one or more QoE measurements at the UE, the first measurement configuration being different from an application- or service-specific measurement configuration; detecting a start of an application or service at the UE, wherein the start of the application or service is a triggering event for initiating the one or more QoE measurements at the UE; performing the one or more QoE measurements at the UE in accordance with the first measurement configuration; and transmitting the one or more QoE measurements in a measurement report to a serving base station Aspect 21: The method of aspect 20, further comprising: identifying one or more application or service IDs associated with the application or service; comparing the determined one or more application or service IDs to a list of IDs stored at the UE, wherein the list of IDs comprises IDs for applications or services associated with the one or more triggering events; determining that the one or more application or service IDs is contained in the list of IDs stored at the UE based at least in part on the comparing, wherein the one or more QoE measurements are performed in accordance with the first measurement configuration based at least in part on the determining Aspect 22: The method of any of aspects 20 or 21 wherein performing the one or more QoE measurements at the UE in accordance with the first measurement configuration further comprises: verifying, at the UE, that the triggering event for initiating the one or more QoE measurements at the UE is not associated with the application- or service-specific measurement configuration, wherein the one or more QoE measurements are performed in accordance with the first measurement configuration based at least in part on the verifying Aspect 23: The method of any of aspects 20 to 22 further comprising: determining that the first measurement configuration comprises a default measurement configuration for performing the one or more QoE measurements at the UE.

Aspect 24: The method of any of aspects 20 to 23 further comprising: receiving a second measurement configuration that comprises an application or services-specific measurement configuration for performing QoE measurements that are specific to one or more specified applications or services at the UE; and performing the QoE measurements at the UE in accordance with the second measurement configuration based at least in part on detecting a start of the one or more specified applications or services at the UE.

Aspect 25: The method of any of aspects 20 to 24 wherein the one or more QoE measurements comprise an application layer throughput measurement, a RTT, a jitter metric, a packet drop rate, or any combination thereof.

Aspect 26: The method of any of aspects 20 to 22 further comprising: receiving the first measurement configuration upon establishing an RRC connection with the serving base station.

Aspect 27: A method for wireless communications at a serving base station, comprising: transmitting, to a UE, a measurement configuration received from an OAM interface for performing the MDT measurements to include in a MDT report, the measurement configuration indicating one or more triggering events comprising the start of an application or service at the UE which, upon occurrence, trigger the MDT measurements at the UE; and receiving, from the UE, the MDT report that includes the MDT measurements.

Aspect 28: The method of aspect 27, further comprising: identifying one or more application or service IDs associated with the application or service, wherein the one or more application or service IDs is contained in a list of IDs stored at the UE and is associated with the one or more triggering events at the UE.

Aspect 29: The method of 28, further comprising: receiving a MDT report that includes the one or more application or service IDs based at least in part on the one or more application or service IDs being contained in the list of IDs stored at the UE.

Aspect 30: The method of any of aspects 28 or 29, wherein obtaining the MDT measurements further comprises: receiving RRM measurements in the MDT report based at least in part on determining that the one or more application or service IDs is contained in the list of IDs stored at the UE.

Aspect 31: The method of aspect 30, wherein the RRM measurements comprise at least one of a RSRP measurement or a RSRQ measurement.

Aspect 32: The method of any of aspects 30 or 31, wherein the RRM measurements comprise periodic measurements, event-triggered measurements, or a combination thereof.

Aspect 33: The method of any of aspects 27 to 32, wherein receiving the MDT measurements further comprises: receiving one or more localization measurements in the MDT report based at least in part on the start of the application or service triggering the obtaining of the one or more localization measurements at the UE.

Aspect 34: The method of aspect 33, wherein receiving the one or more localization measurements further comprises: receiving localization measurements as one or more RSSI measurements or RTT measurements, wherein the localization measurements are associated with common location information, wireless local area network location information, Bluetooth location information, sensor information, or any combination thereof.

Aspect 35: The method of any of aspects 27 to 34, wherein receiving the MDT measurements further comprises: receiving one or more QoS measurements included in the MDT report based at least in part on the start of the application or service triggering the obtaining of the one or more QoS measurements.

Aspect 36: The method of aspect 35, wherein the one or more QoS measurements comprise one or more packet delay measurements or packet loss rate measurements.

Aspect 37: The method of any of aspects 27 to 36, further comprising: measuring one or more QoS metrics based at least in part on receiving the one or more application or service IDs in the MDT report.

Aspect 38: The method of aspect 37, wherein the QoS measurements by the serving base station comprise a data volume measurement, an internet protocol throughout measurement, a packet delay measurement, a packet loss measurement, or any combination thereof.

Aspect 39: A method for wireless communications at a serving base station, comprising: transmitting, to a UE measurement configurations received from an OAM interface for performing MDT measurements to include in a MDT report, the measurement configuration comprising one or more reporting adjustment factors which affect at least one of a reporting interval or a reporting amount for reporting the MDT report; and receiving, from the UE, the MDT report in accordance with the one or more reporting adjustment factors.

Aspect 40: The method of aspect 39, further comprising: allocating one or more reporting adjustment factors for obtaining the MDT measurements by the UE to a first area configuration common to the UE and the serving base station, wherein the MDT measurements are based at least in part on the reporting adjustment factors specific to the first area configuration.

Aspect 41: The method of aspect 40, further comprising: allocating a second set of reporting adjustment factors specific to a second area configuration, wherein the second set of reporting adjustment factors are different from the one or more reporting adjustment factors specific to the first area configuration.

Aspect 42: The method of any of aspects 39 to 41, further comprising: determining that the one or more reporting adjustment factors for obtaining the MDT measurements are to be associated with a time of day in which the serving base station transmits the measurement configuration; and receiving the MDT measurements in accordance with the reporting adjustment factors associated with the time of day.

Aspect 43: The method of any of aspects 39 to 42, wherein the one or more reporting adjustment factors at a first time of day are different from the one or more reporting adjustment factors at a second time of day.

Aspect 44: The method of any of aspects 39 to 43, further comprising: identifying a first network slice of one or more network slices supporting communications between the UE and the serving base station; and determining that the first network slice is contained in a list of network slices, wherein the list of network slices indicates network slices for which the serving base station identifies for the UE to obtain the MDT measurements, wherein the MDT measurements associated with the first network slice are based at least in part on the first network slice being contained in the list of network slices.

Aspect 45: The method of aspect 44, wherein receiving the MDT measurements further comprises: allocating one or more reporting adjustment factors associated with the first network slice and a second network slice, wherein the reporting adjustment factors associated with the first network slice are different from the reporting adjustment factors associated with the second network slice.

Aspect 46: A method for wireless communications at a serving base station, comprising: transmitting, to a UE, a first measurement configuration received from an OAM interface for performing one or more QoE measurements at the UE, the first measurement configuration being different from an application- or service-specific measurement configuration, wherein the first measurement configuration indicates a triggering event for initiating the one or more QoE measurements at the UE as the start of the application or service; and receiving the one or more QoE measurements in a measurement report from the UE.

Aspect 47: The method of aspect 46, further comprising: identifying one or more application or service IDs associated with the application or service, wherein the one or more application or service IDs is contained in a list of IDs stored at the UE and is associated with the one or more triggering events at the UE.

Aspect 48: The method of any of aspects 46 or 47, wherein receiving the one or more QoE measurements further comprises: verifying that the triggering event for initiating the one or more QoE measurements at the UE is not associated with the application- or service-specific measurement configuration, wherein the one or more QoE measurements are received in accordance with the first measurement configuration based at least in part on the verifying.

Aspect 49: The method of any of aspects 46 to 48 further comprising: determining that the first measurement configuration comprises a default measurement configuration for performing the one or more QoE measurements at the UE.

Aspect 50: The method of any of aspects 46 to 49 further comprising: transmitting a second measurement configuration received from the OAM that comprises a UE-specific measurement configuration for QoE measurements that are specific to one or more specified applications or services at the UE; and receiving the QoE measurements from the UE in accordance with the second measurement configuration based at least in part on a start of one more specified applications or services at the UE.

Aspect 51: The method of any of aspects 46 to 50 wherein the one or more QoE measurements comprise an application layer throughput measurement, a RTT, a jitter metric, a packet drop rate, or any combination thereof.

Aspect 52: The method of any of aspects 46 to 51 further comprising: transmitting the first measurement configuration upon establishing an RRC connection with the UE.

Aspect 53: An apparatus for wireless communications comprising a processor; memory coupled with the processor; and instructions stored in the memory and executable by the processor to cause the apparatus to perform a method of any of aspects 1 to 12.

Aspect 54: An apparatus for wireless communications comprising a processor; memory coupled with the processor; and instructions stored in the memory and executable by the processor to cause the apparatus to perform a method of any of aspects 13 to 19.

Aspect 55: An apparatus for wireless communications comprising a processor; memory coupled with the processor; and instructions stored in the memory and executable by the processor to cause the apparatus to perform a method of any of aspects 20 to 26.

Aspect 56: An apparatus comprising at least one means for performing a method of any of aspects 1 to 12.

Aspect 57: An apparatus comprising at least one means for performing a method of any of aspects 13 to 19.

Aspect 58: An apparatus comprising at least one means for performing a method of any of aspects 20 to 26.

Aspect 59: A non-transitory computer-readable medium storing code for wireless communications, the code comprising instructions executable by a processor to perform a method of any of aspects 1 to 12.

Aspect 60: A non-transitory computer-readable medium storing code for wireless communications, the code comprising instructions executable by a processor to perform a method of any of aspects 13 to 19.

Aspect 61: A non-transitory computer-readable medium storing code for wireless communications, the code comprising instructions executable by a processor to perform a method of any of aspects 20 to 26.

Aspect 62: An apparatus for wireless communications comprising a processor; memory coupled with the processor; and instructions stored in the memory and executable by the processor to cause the apparatus to perform a method of any of aspects 27 to 38.

Aspect 63: An apparatus for wireless communications comprising a processor; memory coupled with the processor; and instructions stored in the memory and executable by the processor to cause the apparatus to perform a method of any of aspects 39 to 45.

Aspect 64: An apparatus for wireless communications comprising a processor; memory coupled with the processor; and instructions stored in the memory and executable by the processor to cause the apparatus to perform a method of any of aspects 46 to 52.

Aspect 65: An apparatus comprising at least one means for performing a method of any of aspects 27 to 38.

Aspect 66: An apparatus comprising at least one means for performing a method of any of aspects 39 to 45.

Aspect 67: An apparatus comprising at least one means for performing a method of any of aspects 46 to 52.

Aspect 68: A non-transitory computer-readable medium storing code for wireless communications, the code comprising instructions executable by a processor to perform a method of any of aspects 27 to 38.

Aspect 69: A non-transitory computer-readable medium storing code for wireless communications, the code comprising instructions executable by a processor to perform a method of any of aspects 39 to 45.

Aspect 70: A non-transitory computer-readable medium storing code for wireless communications, the code comprising instructions executable by a processor to perform a method of any of aspects 46 to 52.

Aspect 71: A method for wireless communications at a serving base station, comprising: transmitting, to a UE, a first measurement configuration received from an OAM interface for performing MDT measurements to include in a MDT report and a second measurement configuration received from the OAM interface for performing QoE measurements at the UE, the second measurement configuration being different from an application- or service-specific measurement configuration, wherein the first measurement configuration or the second measurement configuration indicates one or more triggering events comprising the start of an application or service at the UE which, upon occurrence, trigger the MDT measurements or the QoE measurements, or any combination thereof, at the UE; and receiving, from the UE, the MDT report that includes the MDT measurements or a measurement report that includes one or more QoE measurements, or any combination thereof.

Aspect 72: The method of aspect 71, further comprising: identifying one or more application or service IDs associated with the application or service, wherein the one or more application or service IDs is contained in a list of IDs stored at the UE and is associated with the one or more triggering events at the UE.

Aspect 73: The method of any of aspects 71 and 72, wherein receiving the MDT measurements further comprises: receiving one or more localization measurements in the MDT report based at least in part on the start of the application or service triggering the obtaining of the one or more localization measurements at the UE.

Aspect 74: The method of any of aspects 71 to 73, wherein receiving the MDT measurements further comprises: receiving one or more QoS measurements included in the MDT report based at least in part on the start of the application or service triggering the obtaining of the one or more QoS measurements.

Aspect 75: The method of any of aspects 71 to 74, wherein receiving the one or more QoE measurements further comprises: verifying that the triggering event for initiating the one or more QoE measurements at the UE is not associated with the application- or service-specific measurement configuration, wherein the one or more QoE measurements are received in accordance with the second measurement configuration based at least in part on the verifying.

Aspect 76: The method of any of aspects 71 to 75, further comprising: determining that the second measurement configuration comprises a default measurement configuration for performing the one or more QoE measurements at the UE.

Aspect 77: The method of any of aspects 71 to 76, further comprising: transmitting a third measurement configuration received from the OAM that comprises a UE-specific measurement configuration for QoE measurements that are specific to one or more specified applications or services at the UE; and receiving the QoE measurements from the UE in accordance with the third measurement configuration based at least in part on a start of one more specified applications or services at the UE.

Aspect 78: The method of any of aspects 71 to 77, wherein the one or more QoE measurements comprise an application layer throughput measurement, a RTT, a jitter metric, a packet drop rate, or any combination thereof.

Aspect 79: An apparatus for wireless communications at a serving base station, comprising a processor; memory coupled with the processor; and instructions stored in the memory and executable by the processor to cause the apparatus to perform a method of any of aspects 71 through 78.

Aspect 80: An apparatus for wireless communications at a serving base station, comprising at least one means for performing a method of any of aspects 71 through 78.

Aspect 81: A non-transitory computer-readable medium storing code for wireless communications at a serving base station, the code comprising instructions executable by a processor to perform a method of any of aspects 71 through 78.

Aspect 82: A method for wireless communications at a UE comprising: receiving, from an OAM interface, a measurement configuration for performing MDT measurements to include in a MDT report and QoE measurements to include in a QoE report; identifying, from the measurement configuration, one or more triggering events which, upon occurrence, trigger the MDT measurements and the QoE measurements; detecting a start of an application or a service at the UE, wherein the start of the application or service is one of the one or more triggering events; transmitting, to a serving base station, an indication that the one or more triggering events has occurred; obtaining the MDT measurements and the QoE measurements based at least in part on the start of the application or the service being the one of the one or more triggering events; and transmitting, to a server, the MDT report and the QoE report that includes the MDT measurements and the QoE measurements.

Aspect 83: The method of aspect 82, further comprising: identifying one or more application or service IDs associated with the application or service; comparing the one or more application or service IDs to a list of IDs stored at the UE, wherein the list of IDs comprises IDs for applications or services associated with the one or more triggering events; and determining that the one or more application or service IDs is contained in the list of IDs stored at the UE based at least in part on the comparing.

Aspect 84: The method of aspect 83, further comprising: generating the MDT report and the QoE report to include the one or more application or service IDs based at least in part on determining that the one or more application or service IDs is contained in the list of IDs stored at the UE.

Aspect 85: The method of any of aspects 83 to 84, wherein obtaining the minimization of drive test measurements further comprises: obtaining RRM measurements to include in the MDT report based at least in part on determining that the one or more application or service IDs is contained in the list of IDs stored at the UE.

Aspect 86: The method of aspect 85, wherein the RRM measurements comprise at least one of a RSRP measurement or a RSRQ measurement.

Aspect 86: The method of any of aspects 85 to 86, wherein the RRM measurements comprise periodic measurements, event-triggered measurements, or any combination thereof.

Aspect 88: The method of any of aspects 82 to 87, wherein obtaining the minimization of drive test measurements further comprises: obtaining one or more localization measurements to include in the MDT report based at least in part on the start of the application or the service triggering the obtaining of the one or more localization measurements.

Aspect 89: The method of aspect 88, wherein obtaining the one or more localization measurements further comprises: obtaining localization measurements as one or more RSSI measurements or RTT measurements, wherein the localization measurements are associated with common location information, wireless local area network location information, Bluetooth location information, sensor information, or any combination thereof.

Aspect 90: The method of any of aspects 82 to 89, wherein obtaining the minimization of drive test measurements further comprises: obtaining one or more QoS measurements to include in the MDT report based at least in part on the start of the application or the service triggering the obtaining of the one or more QoS measurements.

Aspect 91: The method of aspect 90, wherein the one or more QoS measurements comprise one or more packet delay measurements or packet loss rate measurements.

Aspect 92: The method of any of aspects 82 to 91, further comprising: receiving, in the measurement configuration, an indication that the UE is to include one or more application or service identifiers in the MDT report, wherein the one or more application or service identifiers prompt QoS measurements by a serving base station.

Aspect 93: The method of aspect 92, wherein the QoS measurements by the serving base station comprise a data volume measurement, an internet protocol throughout measurement, a packet delay measurement, a packet loss measurement, or any combination thereof.

Aspect 94: An apparatus comprising a processor; memory coupled with the processor; and instructions stored in the memory and executable by the processor to cause the apparatus to perform a method of any of aspects 82 through 93.

Aspect 95: An apparatus comprising at least one means for performing a method of any of aspects 82 through 93.

Aspect 96: A non-transitory computer-readable medium storing code the code comprising instructions executable by a processor to perform a method of any of aspects 82 through 93.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processing (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) comprising:
receiving, from an operations, administration, and maintenance (OAM) interface, a measurement configuration for performing quality of experience measurements to include in a quality of experience report;
identifying, from the measurement configuration, one or more triggering events which, upon occurrence, trigger the quality of experience measurements;
detecting a start of an application or a service at the UE, wherein the start of the application or service is one of the one or more triggering events;

obtaining the quality of experience measurements based at least in part on the start of the application or the service being one of the one or more triggering events;

transmitting, to a serving network device, an indication that the one or more triggering events has occurred;

obtaining minimization of drive test measurements based at least in part on the start of the application or service being one of the one or more triggering events, wherein obtaining the minimization of drive test measurements comprises obtaining one or more localization measurements as one or more received signal strength indicator measurements or round trip time measurements, and wherein the one or more localization measurements are associated with common location information, wireless local area network information, Bluetooth location information, sensor information, or any combination thereof; and transmitting, to the serving network device, a report associated with the quality of experience measurements and the minimization of drive test measurements.

2. The method of claim 1, further comprising:

identifying one or more application or service identifiers (IDs) associated with the application or service;

comparing the one or more application or service IDs to a list of IDs stored at the UE, wherein the list of IDs comprises IDs for applications or services associated with the one or more triggering events; and determining that the one or more application or service IDs is contained in the list of IDs stored at the UE based at least in part on the comparing.

3. The method of claim 2, further comprising:

generating the quality of experience report to include the one or more application or service IDs based at least in part on determining that the one or more application or service IDs is contained in the list of IDs stored at the UE.

4. The method of claim 2, further comprising:

obtaining minimization of drive test measurements based at least in part on the start of the application or the service being one of the one or more triggering events, wherein obtaining the minimization of drive test measurements comprises obtaining radio resource management measurements based at least in part on determining that the one or more application or service IDs is contained in the list of IDs stored at the UE.

5. The method of claim 4, wherein the radio resource management measurements comprise at least one of a reference signal received power measurement or a reference signal received quality measurement.

6. The method of claim 4, wherein the radio resource management measurements comprise periodic measurements, event-triggered measurements, or any combination thereof.

7. The method of claim 1, further comprising:

obtaining minimization of drive test measurements based at least in part on the start of the application or the service being one of the one or more triggering events, wherein obtaining the minimization of drive test measurements comprises obtaining one or more quality of service measurements based at least in part on the start of the application or the service triggering the obtaining of the one or more quality of service measurements.

8. The method of claim 7, wherein the one or more quality of service measurements comprise one or more packet delay measurements or packet loss rate measurements.

9. The method of claim 1, further comprising:

receiving, in the measurement configuration, an indication that the UE is to include one or more application or service identifiers in a report, wherein the one or more application or service identifiers prompt quality of service measurements by the serving network device.

10. The method of claim 9, wherein the quality of service measurements by the serving network device comprise a data volume measurement, an internet protocol throughout measurement, a packet delay measurement, a packet loss measurement, or any combination thereof.

11. An apparatus for wireless communications, comprising:

one or more processors;

memory coupled with the one or more processors; and instructions stored in the memory and executable by the one or more processors to cause the apparatus to:

receive, from an operations, administration, and maintenance (OAM) interface, a measurement configuration for performing quality of experience measurements to include in a quality of experience report;

identify, from the measurement configuration, one or more triggering events which, upon occurrence, trigger the quality of experience measurements;

detect a start of an application or a service at a user equipment (UE), wherein the start of the application or the service is one of the one or more triggering events;

obtain the quality of experience measurements based at least in part on the start of the application or the service being one of the one or more triggering events;

transmit, to a serving network device, an indication that the one or more triggering events has occurred;

obtain minimization of drive test measurements based at least in part on the start of the application or service being one of the one or more triggering events, wherein obtaining the minimization of drive test measurements comprises obtaining one or more localization measurements as one or more received signal strength indicator measurements or round trip time measurements, and wherein the one or more localization measurements are associated with common location information, wireless local area network information, Bluetooth location information, sensor information, or any combination thereof; and transmit, to the serving network device, a report associated with the quality of experience measurements and the minimization of drive test measurements.

12. The apparatus of claim 11, wherein the instructions are further executable by the one or more processors to cause the apparatus to:

identify one or more application or service identifiers (IDs) associated with the application or service;

compare the one or more application or service IDs to a list of IDs stored at the UE, wherein the list of IDs comprises IDs for applications or services associated with the one or more triggering events; and determine that the one or more application or service IDs is contained in the list of IDs stored at the UE based at least in part on the comparing.

13. The apparatus of claim 11, wherein the instructions are further executable by the one or more processors to cause the apparatus to:

obtain minimization of drive test measurements based at least in part on the start of the application or the service being one of the one or more triggering events, wherein, to obtain the minimization of drive test measurements, the instructions are executable by the processor to cause the apparatus to obtain one or more localization measurements based at least in part on the start of the application or service triggering the obtaining of the one or more localization measurements.

14. The apparatus of claim 12, wherein the instructions are further executable by the one or more processors to cause the apparatus to:
generate the quality of experience report to include the one or more application or service IDs based at least in part on determining that the one or more application or service IDs is contained in the list of IDs stored at the UE.

15. The apparatus of claim 12, wherein the instructions are further executable by the one or more processors to cause the apparatus to:
obtain minimization of drive test measurements based at least in part on the start of the application or the service being one of the one or more triggering events, wherein, to obtain the minimization of drive test measurements, the instructions are executable by the processor to cause the apparatus to obtain radio resource management measurements based at least in part on determining that the one or more application or service IDs is contained in the list of IDs stored at the UE.

16. The apparatus of claim 15, wherein the radio resource management measurements comprise at least one of a reference signal received power measurement or a reference signal received quality measurement.

17. The apparatus of claim 15, wherein the radio resource management measurements comprise periodic measurements, event-triggered measurements, or any combination thereof.

18. The apparatus of claim 13, wherein the instructions to obtain the one or more localization measurements are executable by the one or more processors to cause the apparatus to:
obtain localization measurements as one or more received signal strength indicator measurements or round trip time measurements, wherein the localization measurements are associated with common location information, wireless local area network location information, Bluetooth location information, sensor information, or any combination thereof.

19. The apparatus of claim 11, wherein the instructions are further executable by the one or more processors to cause the apparatus to:
obtain minimization of drive test measurements based at least in part on the start of the application or the service being one of the one or more triggering events, wherein, to obtain the minimization of drive test measurements, the instructions are executable by the processor to cause the apparatus to obtain one or more quality of service measurements based at least in part on the start of the application or the service triggering the obtaining of the one or more quality of service measurements.

20. The apparatus of claim 19, wherein the one or more quality of service measurements comprise one or more packet delay measurements or packet loss rate measurements.

21. The apparatus of claim 11, wherein the instructions are further executable by the one or more processors to cause the apparatus to:
receive, in the measurement configuration, an indication that the UE is to include one or more application or service identifiers in a report, wherein the one or more application or service identifiers prompt quality of service measurements by the serving network device.

22. The apparatus of claim 21, wherein the quality of service measurements by the serving network device comprise a data volume measurement, an internet protocol throughout measurement, a packet delay measurement, a packet loss measurement, or any combination thereof.

23. A method for wireless communications at a serving network device, comprising:
transmitting, to a user equipment (UE), a measurement configuration received from an operations, administration, and maintenance (OAM) interface for performing quality of experience measurements to include in a quality of experience report;
receiving, from the UE, an indication that one or more triggering events has occurred based at least in part on transmitting the measurement configuration; and
receiving, from the UE, a report associated with the quality of experience measurements and minimization of drive test measurements at the UE, wherein receiving the minimization of drive test measurement comprises receiving one or more localization measurements as one or more received signal strength indicator measurements or round trip time measurements, and wherein the one or more localization measurements are associated with common location information, wireless local area network information, Bluetooth location information, sensor information, or any combination thereof.

24. The method of claim 23, wherein the measurement configuration indicates the one or more triggering events, wherein the one or more triggering events comprise a start of an application or a service at the UE which, upon occurrence, trigger minimization of drive test measurements, the quality of experience measurements, or any combination thereof, at the UE.

25. The method of claim 24, further comprising:
identifying one or more application or service identifiers (IDs) associated with the application or the service, wherein the one or more application or service IDs is contained in a list of IDs stored at the UE and is associated with the one or more triggering events at the UE.

26. An apparatus for wireless communication, comprising:
one or more processors;
memory coupled with the one or more processors; and
instructions stored in the memory and executable by the one or more processors to cause the apparatus to:
transmit, to a user equipment (UE), a measurement configuration received from an operations, administration, and maintenance (OAM) interface for performing quality of experience measurements to include in a quality of experience report;
receive, from the UE, an indication that one or more triggering events has occurred based at least in part on transmitting the measurement configuration; and
receive, from the UE, a report associated with the quality of experience measurements and minimization of drive test measurements at the UE, wherein receiving the minimization of drive test measurement comprises receiving one or more localization measurements as one or more received signal strength indicator measurements or round trip time measurements, and wherein the one or more localization measurements are associated with common location information, wireless local area network information, Bluetooth location information, sensor information, or any combination thereof.

27. The apparatus of claim 26, wherein the measurement configuration indicates the one or more triggering events, wherein the one or more triggering events comprise a start of an application or a service at the UE which, upon occurrence, trigger minimization of drive test measurements, the quality of experience measurements, or any combination thereof, at the UE.

28. The apparatus of claim 27, wherein the instructions are further executable by the one or more processors to cause the apparatus to:
   identify one or more application or service identifiers (IDs) associated with the application or the service, wherein the one or more application or service IDs is contained in a list of IDs stored at the UE and is associated with the one or more triggering events at the UE.

* * * * *